(12) United States Patent
Shtuchkin et al.

(10) Patent No.: US 10,324,828 B2
(45) Date of Patent: Jun. 18, 2019

(54) GENERATING ANNOTATED SCREENSHOTS BASED ON AUTOMATED TESTS

(71) Applicant: Dropbox, Inc., San Francisco, CA (US)

(72) Inventors: Alexander Shtuchkin, San Francisco, CA (US); Olga Stepanova, San Francisco, CA (US); Chitra Gulabrani, San Francisco, CA (US); William Wu, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 204 days.

(21) Appl. No.: 15/083,073

(22) Filed: Mar. 28, 2016

(65) Prior Publication Data

US 2017/0277625 A1   Sep. 28, 2017

(51) Int. Cl.
  *G06F 9/44* (2018.01)
  *G06F 11/36* (2006.01)

(52) U.S. Cl.
  CPC ................ *G06F 11/3688* (2013.01)

(58) Field of Classification Search
  CPC ...... G06F 11/3688; G06F 11/347; G06F 8/68; G06F 8/71; G06F 8/73
  See application file for complete search history.

(56) References Cited

U.S. PATENT DOCUMENTS

| | | | | |
|---|---|---|---|---|
| 9,600,400 | B1 * | 3/2017 | McDowell | G06F 11/3664 |
| 2007/0261035 | A1 * | 11/2007 | Duneau | G06F 11/3688 |
| | | | | 717/135 |
| 2011/0208470 | A1 * | 8/2011 | Yasuda | G06F 11/3668 |
| | | | | 702/123 |
| 2011/0314343 | A1 * | 12/2011 | Hoke | G06F 11/3672 |
| | | | | 714/45 |
| 2012/0317549 | A1 * | 12/2012 | Cunningham | G06F 11/3612 |
| | | | | 717/128 |
| 2013/0004087 | A1 * | 1/2013 | Kumar | G06K 9/6202 |
| | | | | 382/218 |
| 2013/0247006 | A1 * | 9/2013 | Trowbridge | G06F 9/44 |
| | | | | 717/126 |
| 2017/0337122 | A1 * | 11/2017 | Bolajwar | G06F 11/3688 |

* cited by examiner

*Primary Examiner* — Duy Khuong T Nguyen
(74) *Attorney, Agent, or Firm* — Hickman Palermo Becker Bingham LLP

(57) ABSTRACT

Techniques are described herein for generating annotated documentation of a web application based on scripts that simulate tasks performed within the web application. While running each script, an automated testing utility captures individual screens within the web application based on a first set of criteria. The first set of criteria includes capturing a screen after a page loads, before clicking on a DOM element, and before validating the occurrence of an element or event within the web application. An annotation engine then annotates each screen based on a second set of criteria. The second set of criteria includes highlighting each given screen based on the type event and location of the element that triggered the screen capture. The annotation utility additionally visualizes contextual metadata that provides the viewer with a reference of what they are looking at.

28 Claims, 13 Drawing Sheets

FIG. 2A

SCRIPT 200
team:limited team join.scp

Step 1. load html.document(url= "www.exampleflow.com");

Step 2. click html.document.element.button(id= "invite_people");

Step 3. input html.document.element.textbox(5678@gmail.com);

Step 4. wait html.document.input_text() == VALID_ADDRESS;

Step 5. click html.document.element.button(id= "invite_to_team");

Step 6. load html.document(url="www.dummyemailserver.com");

Step 7. wait html.document.element.status_bar("Invited 5678@gmail.com");

FIG. 2B

Screen Capture and Annotation Criteria 202

| TRIGGER | CAPTURE TIME | Element Highlight |
|---|---|---|
| Load Page step | After | - |
| Click Element step | Before | Yellow |
| Wait Element step | After | Purple |
| Wait Event step | Before | Purple |

FLOW DIAGRAM 430

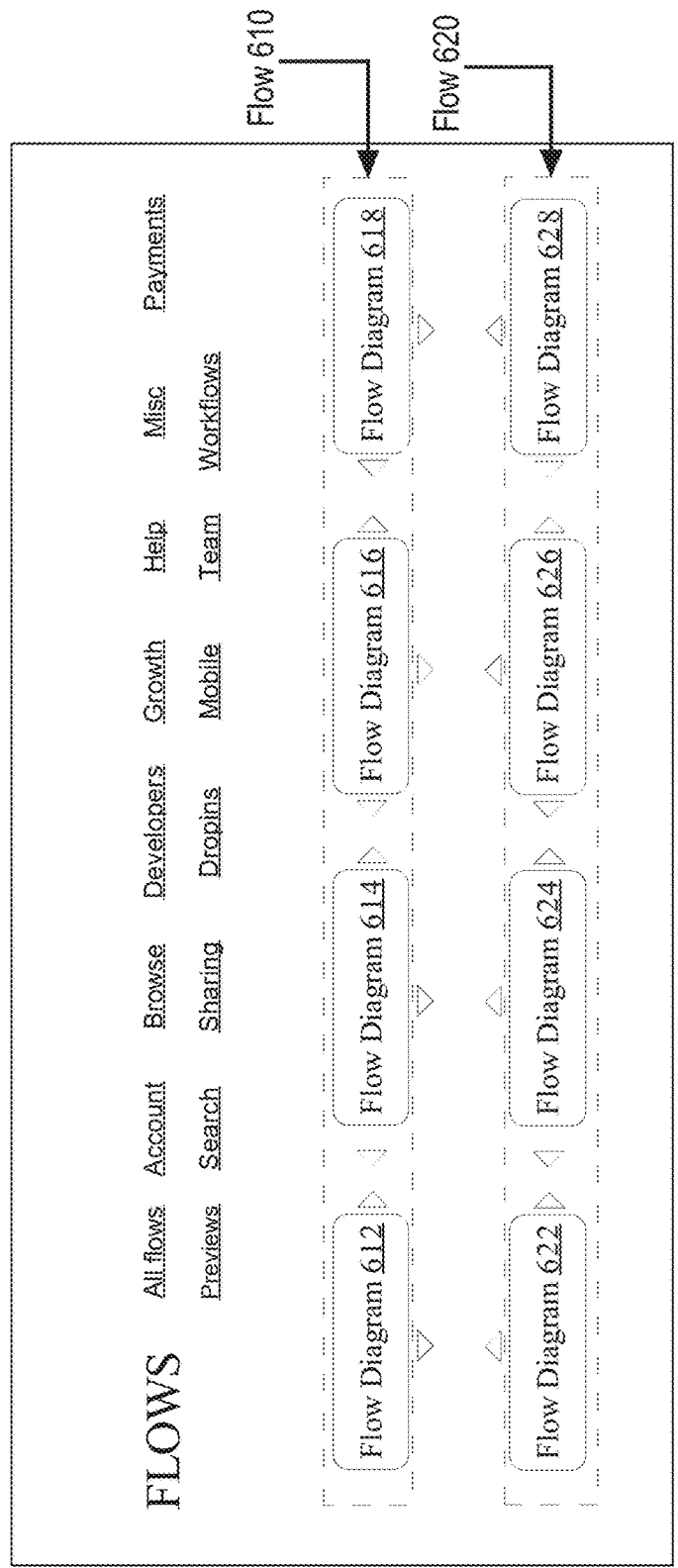
FIG. 6A   FLOW COMPARISON INTERFACE 600

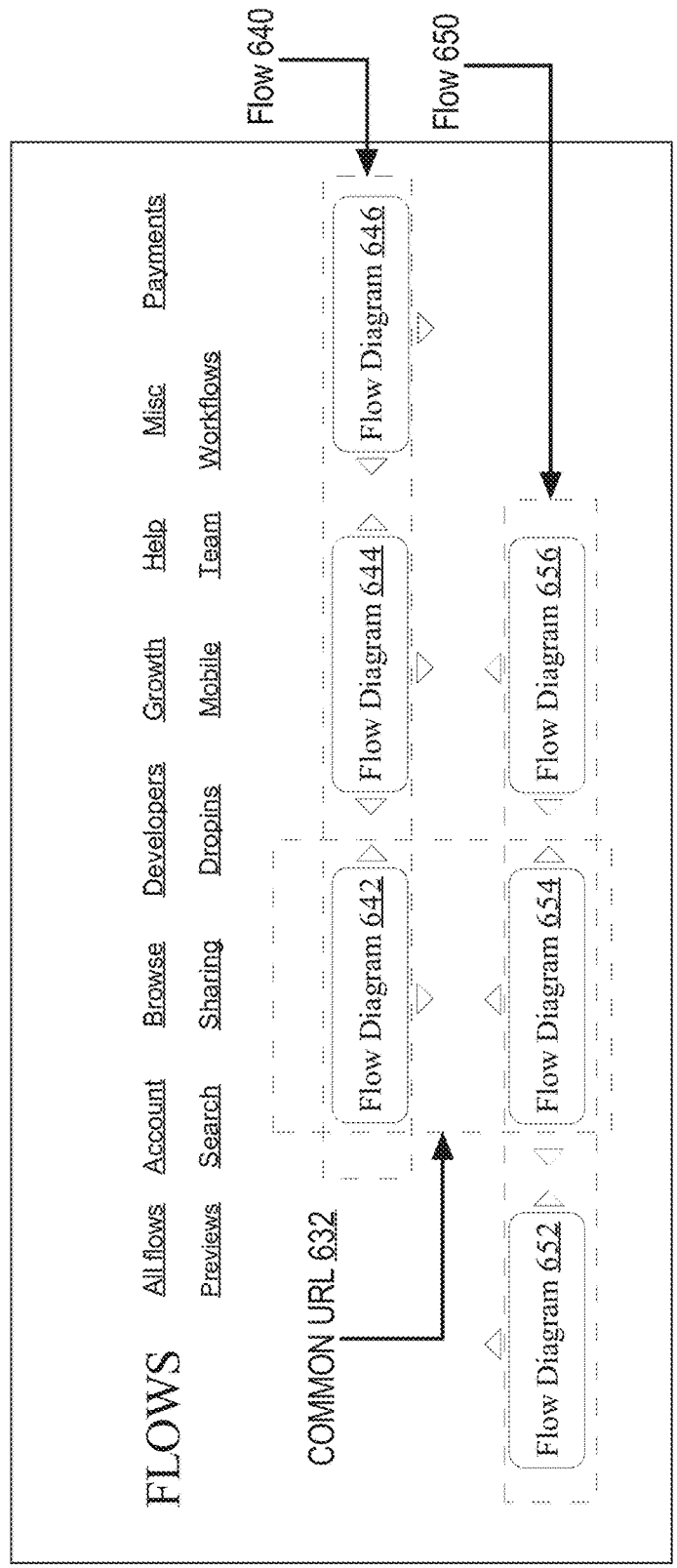
FIG. 6B     FLOW COMPARISON INTERFACE 630

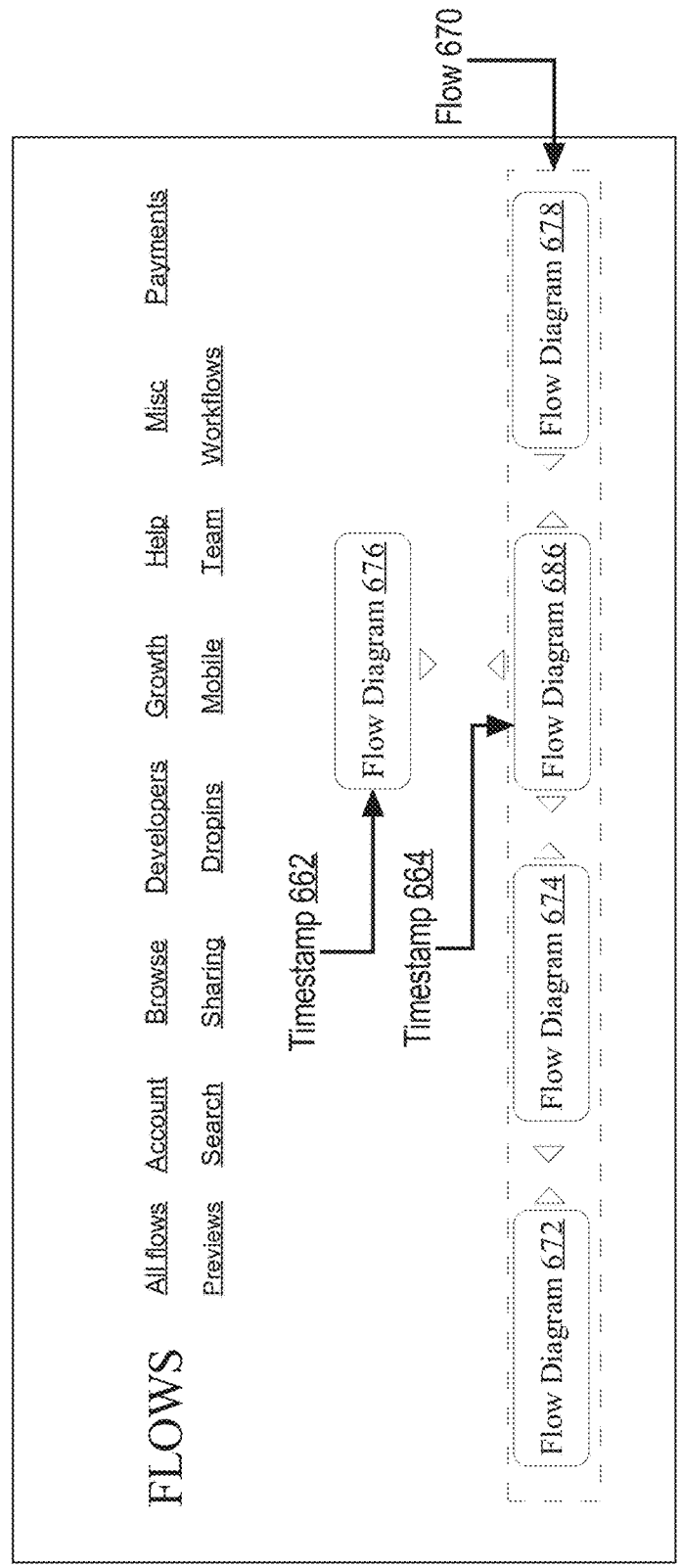
FIG. 6C    FLOW COMPARISON INTERFACE 660

GENERATING ANNOTATED SCREENSHOTS BASED ON AUTOMATED TESTS

FIELD OF THE INVENTION

The present invention relates generally to visualizing user experience in a complex web application, and more specifically to improved computer-implemented techniques for automatically generating sequences of annotated diagrams that illustrate specific interactions with a web application when attempting to perform a particular task.

BACKGROUND

Web developers often add new features to a web application after the web application has already been deployed to actual users. These new features may interfere with older features in terms of user experience. For example, displaying a "register for our email list" button alongside a "sign up now" button may cause user confusion as to which button a user should click in order to create a new user account.

User confusion can cause significant problems once a new feature is deployed. For example, user sign-up rate could drop based on the addition of the email list button, which is unrelated to creating a new user account. Furthermore, the cause of the drop in sign-up rate may be buried three or four web pages deep in the sequence of user interface interactions required to create a new user account. Thus, the problem remains hidden until an actual user or a quality assurance (QA) specialist identifies the problem.

Traditional testing tools may not catch these issues because the web application still technically works as intended. For example, a testing tool for checking the "create new user" task may not throw an error because the testing tool may only simulate whether the features, once activated, act properly.

Once an error is found, documentation technologies allow an end user or tester to screencast or video tape the steps taken in order to reproduce an error. Some of these technologies annotate the steps taken that caused the error. Then a troubleshooting specialist may compare the steps the user performed with steps the user should have performed in order to rectify the error.

Unfortunately, there is no current technology to review expected user behavior each time a feature is added to a complex web application for QA purposes. The current practice of incremental deployment of features in a web application causes user experience (UX) issues to arise sporadically, and the QA specialist must explore the new features within the web application in hopes of spotting an error.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2A is a block diagram illustrating an example script that is used to generate a flow;

FIG. 2B is block diagram illustrating multiple sets of example criteria used to generate a flow;

FIG. 6A is an example diagram illustrating a user interface that compares two flows;

FIG. 6B is an example diagram illustrating a user interface that compares two flows that each including a flow diagram generated from a common URL;

FIG. 6C is an example diagram illustrating a user interface that compares two versions of a single flow.

DETAILED DESCRIPTION

Figure 1:
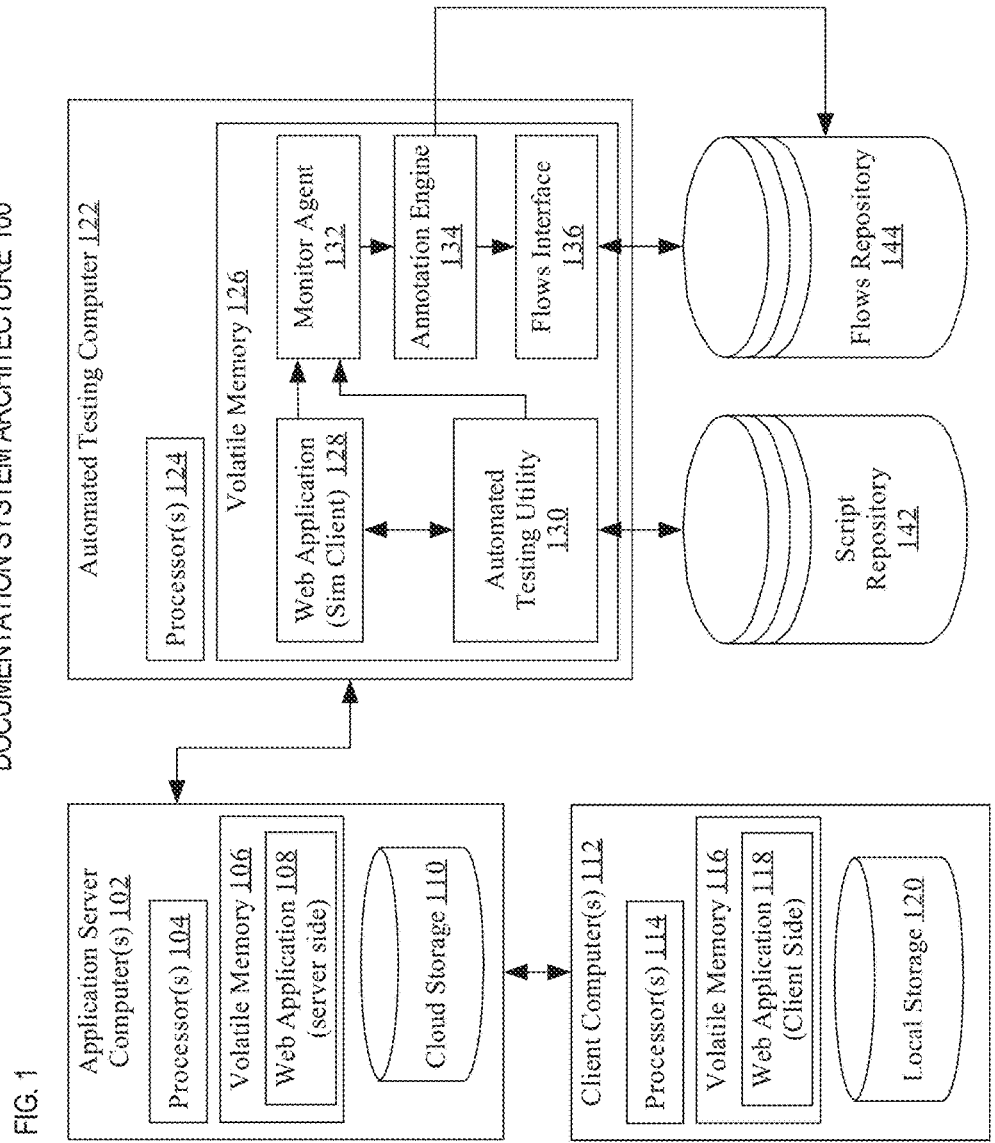
FIG. 1 is a block diagram illustrating an example of a documentation system architecture for a web application.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for generating annotated documentation of a web application also referred to herein as "flows". The annotated documentation is generated based on scripts that simulate the steps necessary to perform a task within the web application. A script is executed as an automated test to simulate, at least some, user actions to perform the task.

According to one technique, during an automated test of the web application, screenshots are taken of the web application's graphic user interface (GUI). Screenshots are taken based on a set of criteria that triggers a screen capture immediately prior to or immediately after certain types of input and certain types of web application events. A monitoring agent stores the location of elements that receive input and the location of elements associated with events that trigger a screen capture. For example, the location of a button that receives a click may be stored. An annotation engine highlights areas around the stored locations of these elements in their corresponding screenshots.

Additional metadata associated with the automated test is overlaid on the top of screenshot in a status bar to provide context. For example, the status bar displays the user account that is performing a particular step in the automated test. In addition, one or more controls are provided to trace the line number in the script used to run the automated test with its corresponding screenshot.

According to another technique, generated flows are stored in a flow repository and indexed in an index of flows.

The index is used to support keyword searching for flows. For example, according to one technique, a user may search for a flow in the index based on a name of the flow, or a Uniform Resource Locator (URL) associated with a flow diagram of the flow.

According to another technique, the flow repository stores multiple versions of a flow. For example, a new version of a flow may be stored in the flow repository after a feature of the web application has been changed, modified, or updated. A new version of a flow may be stored in the flow repository only if it is detected that the new version differs from a previous version of the flow. The detection may be based on comparisons between pixels of screenshots of the previous flow version and pixels of screenshots of the new version. A technique is also provided for generating and presenting a visual comparison in a graphical user interface of the differences between different versions of a flow corresponding to different versions of the web application. With this technique, a user can visually discern user interface differences between the different web application versions.

Techniques described herein improve a computer's ability to interface with a user, improve the functioning of a computer to perform QA tasks, and improve the functioning of a computer or storage device to store QA data. First, techniques described herein improve a computer's ability to interface with a user by automatically generating documentation on how to interact with a web application to achieve specific goals. Without the use of flows, a user would have to individually "explore" the web application until the user found the specific functionality that the user sought. Interfacing with the web application is improved by providing these flows to users, either directly or indirectly. Second, techniques described herein improve the functioning of a computer by pre-processing input and instructions required to render possible problem areas deep within a web application. Every screenshot captured to generate a flow is based on a specific set of actions and events that would otherwise require the computer to process input and execute web application instructions to render that screenshot. By pre-processing the input and instructions, the computer can quickly render an annotated GUI buried deep within a web application that would normally require processing and transferring significant amounts of data between a client and server computer. Third, there are various features described herein that save space in memory of a computer or attached storage device by only capturing and annotating specific QA data that may be useful. Trigger criteria is used to only capture some screenshots, rather than all possible screenshots. Of those screenshots captured, some screenshots may be de-duplicated before they are annotated with additional QA data and stored. Additionally, after the web application is updated, a new flow may be generated using a combination of old flow diagrams and new flow diagrams in order to save space in storage and/or memory by not storing data that would be redundant.

Types of Users

Detailed documentation of how a simulated user interacts with a user interface provides various benefits depending on the type of user searching for the documentation. Different embodiments may have more or less features implemented depending on the type of user the embodiment is directed to. For example, quality assurance specialists use flows to identify customer confusion or abnormalities caused by the user interface. Areas of where the user clicks and how the web application interacts with a simulated user are emphasized, so the quality assurance specialist can immediately identify the controls or elements that possibly need to change.

Developers use flows to debug errors, so the flow interface includes stack trace controls for toggling between a highlighted line in a script and a corresponding screenshot of the flow associated with that script. The stack trace feature allows the developer to identify the line of a script that uses an element in the web application, so the developer can modify the element causing the error.

Project managers use flows to monitor the progress of a web application's development. By providing alerts as to when flows are updated or when new flows are created, a project manager may more accurately determine when a particular feature is ready for deployment, or how team resources need to be allocated in order to meet deadlines.

Translation specialists use flows to compare how automated translations may appear within a particular user interface. Because corresponding words are larger or smaller in different languages, these words may need to be changed in order to quickly and accurately convey the information recited in the base language. Similarly, some words may have different meanings based on the context in which they are presented. Visualizing the user interface in a series of documented steps allows these types of problems to be caught early on, rather than requiring embarrassing post deployment modifications.

Sales representatives, customer service representatives, and users themselves may use flows to instruct users on how to use a web application or service to accomplish a particular task. When a user needs guidance in performing a particular task, the corresponding flow can be searched. Then a screen-by-screen procedure may be provided, so the user can accomplish the task. The sales representative or the customer service representative does not actually have to run the web application or implement screen casting software in order to view the screens that the user is viewing. Instead, the representative can simply map what the user describes to a particular annotated screenshot in the flow.

System Overview

Referring to FIG. 1, it is a block diagram that depicts a documentation system architecture 100 for a web application according to one embodiment.

In the embodiment illustrated in FIG. 1, application server computer(s) 102 has one or more processors 104, volatile memory 106, and cloud storage 110. The application server computer is executing web application 108 on the server side. Application server computer 102 may be one computer, multiple computers in a cluster, or a collection of computers specialized towards different tasks. For example, application server computer 102 may be running the primary web application 108 for creating accounts, while another computer (not shown) is configured to operate as an email server that sends confirmation emails to said accounts. The server side web application 108 sends messages to the email server to further send emails to one or more client email addresses.

The documentation system architecture 100 may also have one or more client computer(s) 112 further including one or more processors 114, volatile memory 116, and local storage 120. The processors 114 and volatile memory 116 work in conjunction to execute a web application 118 on the client side. The client side of the web application 118 may be configured to run in a web browser or as standalone program. The server side web application 108 and client side web application 118 may communicate to provide a full service to a user. The client computer may be implemented as a general purpose computer or as a mobile device with specialized hardware such as a touch screen. Web application 118 may have different versions for different operating systems and different hardware components in client computer 112. Depending on the type of web application 118, web application 118 may be connected to other client computers. For example, web application 118 may be configured to send messages or files to other client computers with or without application server computer 102 acting as an intermediary.

The documentation system architecture 100 has one or more automated testing computers 122 further including one or more processors 124, volatile memory 126, and repositories 142, 144. The processor(s) 124 and volatile memory 126 work in conjunction to execute a web application 128 as a simulated client. Although displayed as a separate computer, automated testing computer 122 and server computer 102 are the same computer in some embodiments. However, developers may wish to create their own flows, not based on the main software running on server computer 102, so automated testing computer can be a local computer running a simulated client-side of web application 128.

The simulated client-side of web application 128 may be configured to run in one or more different types of web browsers at once or as a standalone program on one or more operating systems or emulated hardware devices. The automated testing computer 122 may be implemented as a general purpose computer or as a mobile device with specialized hardware such as a touch screen. The web application 128 may have different versions for different operating systems and different hardware components in the automated testing computer 122.

In addition to executing the web application, automated testing computer 122 also executes automated testing utility 130, monitoring agent 132, annotation engine 134, and flows interface 136. These specialized programs may also run on separate computers. For example the flows interface 136 may execute on a first computer, while the web application 128, the automated testing utility 130, the monitoring agent 132, and the annotation engine 134 all execute on a second computer.

Automated testing computer 122 has access to two repositories 142 and 144. These repositories are depicted as external to automated testing computer 122 in FIG. 1, but may be implemented as an internal component. In some embodiments, repositories 142 and 144 are configured to be accessed by multiple computers. For example, automated test repository 142 or flows repository 144 may be implemented as a remote file system or database accessible by one or more automated testing computers or other personal computers used by developers. Each repository 142, 144 may be spread across multiple persistent storage devices or may be executing entirely within one computer.

Web Application

In some embodiments, a server computer 102 runs code for the web application on a server side 108 that serves web pages, files, and other content to a web browser executing the web application on the client side 118, 128. Example web browsers executing on the client side may include Google Chrome, Internet Explorer, Firefox, Safari, or Opera. In alternative embodiments, the client side application 118, 128 executes without the use of a browser. In either embodiment, the web application 128 has elements that can be identified and located through accessible source code.

An "element" refers to a data structure that can be identified by an identifier and/or a relationship with another element. For example, an element may have a unique identifier that is a string, such as a name, number, or symbol. Accordingly, the element may be referenced and/or retrieved using the identifier. Also for example, if a particular element is the first child element of a parent element, then the particular element may be referenced and/or retrieved using a pointer to the parent element and then retrieving a pointer to the first child element. A browser and/or runtime environment may provide one or more Application Programming Interfaces ("APIs") for referencing and/or retrieving elements.

For example, a web application that executes on the client side 118, 128 as a series of HTML web pages includes identifiable Document Object Model (DOM) elements. In the HTML DOM, the element object represents an HTML element. HTML element objects can have child nodes of type element node, text node, or comment node. HTML Element objects may also have attributes. Attributes are data that identifies and/or describes the appearance, behavior, and/or content of an HTML element object. The DOM elements can be located and monitored by external programs or plugins that use one or more APIs to reference and/or retrieve an element by a unique identifier, and/or a relative and/or absolute location in a DOM. Selector APIs and) XPaths are two examples of APIs that may be available in a browser to reference and/or retrieve elements within a DOM. An element may be a particular type of element. For example, one element may be a button, another element may be a text field, and another element may be an image.

In alternative embodiments, the web application has elements that can be located and monitored without using standard DOM elements. These elements may be defined using XML files, JSON files, or any other proprietary file type. A monitoring agent 132 or automated testing utility 130 may be configured to identify these elements based on source code. The source code corresponding to these elements are mappable to visible elements presented on a screen of a client device. In embodiments where a web application has multiple screens or pages, each screen or page may be defined as a separate web element with elements contained inside the parent element.

Scripts and Script Repository

The script repository 142 has records of scripts. A script as defined herein refers to a sequence of user-computer interactions within a user interface that achieves some goal within a computer program or web application. Examples of goals include changing a user password; performing a purchase transaction within a web application; joining a team/group to grant authorizations to read, write, or destroy files controlled by the group; or verifying/changing an email address associated with a user account.

Each script may define a sequence of discrete steps taken by a simulated user, web application, and/or browser to perform a certain task. For example, the script may define a step such as the click of a button in a web application to move to the next screen of the application. In another example, the script may include a step that waits for the web application to validate a first input with a second input before accepting the first input as a password.

Thus, an example script may include:
1. click html.document.element.button(id="click here");
2. wait for html.document.element.textbox("success");
3. click html.document.element.button(id="confirm");

These scripts may be routinely executed at computer 122 to test any new code snippet. Alternatively, or additionally, the scripts may be executed automatically every time a developer commits new code to the master branch of a code repository (not shown). Alternatively, the scripts may be executed periodically, such as daily, weekly, monthly, or yearly.

Alternative embodiments simulate user actions by scripting input received at the operating system level. The scripts can also be written to track output at the operating system level. For example, an operating system level script may include:

1. "click pixel 320×540"
2. "wait for pixel 444×555==xEBEBEB"
3. "click pixel 220×550"

The script repository 142 may be a database or file system. Each script in script repository 142 may have a name and date associated with the script. The scripts may be indexed by name, date, or data within the script itself.

Automated Testing Utility

The automated testing utility 130 facilitates creation and execution of scripts. In some embodiments, the automated testing utility 130 is for web browser automation. In this embodiment, each script may define at least one action or event that occurs within a web browser.

For web-based applications, the automated testing utility 130 may be implemented as a plug-in for a web browser. An embodiment of an automated testing utility 130 for a web browser is Selenium IDE, Selenium RC, or Selenium webdriver developed by Selenium. In alternative embodiments, the automated testing utility 130 is for operating system level actions. An example of an operating system level automated testing utility is Macro Express sold by Insight Software Solutions.

These automated testing utilities do not require that a developer code each step in the script from scratch. Instead the utility may include controls to record and edit specific actions or events, and additional controls that facilitate adding test specific commands to the script. For example, a first control may be used to record user clicks, and a second control may be used to insert wait/validation conditions. These controls interpret the received input and transform input into script level syntax that can then be executed by the automated testing utility 130 in a step-by-step fashion at a later time.

Flows Repository

The flows repository 144 has annotated screenshots and metadata (i.e. flow diagrams) that define each particular sequence of annotated diagrams (i.e. flows). A script or automated test involves the actions and events taken by the simulated user, browser, and web applications. By contrast, a flow includes documentation of these actions and events as well as background context that is exposed to the user without requiring that the user run the web application or execute a script that runs the web application.

Each flow diagram may be implemented as a web page with metadata that points to the next and previous flow diagrams for that flow. The flow diagram may also include controls that can be used to import an additional flow for comparison, export a flow (save, share, or print), jump back to the root page of the flow, or jump to a home screen or search page.

In order to create a flow, a monitoring agent 132 captures screenshots and metadata while a script is being executed by the automated testing utility 130, and an annotation engine 134 adds background context and annotations that explain the actions and events taken.

Monitoring Agent

Without affecting an executing automated test, a monitoring agent 132 stores screenshots of the web application while the automated test is running. Additionally, the monitoring agent 132 may capture metadata from one or more scripts, the automated testing utility 130, the web application 128 itself, or any combination thereof while the automated test is executing.

The monitoring agent 132 may be implemented as an external program, a plugin for a browser, or an extension of the automated testing utility 130. In an embodiment, the monitoring agent 132 executes as an extension that hooks into the automated testing utility 130 in order to capture screenshots and data produced by the automated testing utility. In alternative embodiments, the extension or plugin can hook directly into the application that is being tested, or the environment that is executing the application (such as a web browser or a hypervisor). For example, rather than storing a picture of a web page as a "screenshot", the monitoring agent may store a copy of the HTML file as a "screenshot". This may include storing style sheets and images in addition to the source code of the page.

The monitoring agent 132 executes in tandem with the automated testing utility 130 to not only capture screenshots during testing of a web application, but also to capture metadata that describes the context in which the test is being performed. For example, a user that is simulated to be a "pro" user (one that has purchased the full product) is likely to encounter additional features and options in the web application. Thus, whenever an automated test is performed, the metadata defining the context of each screen may also be captured.

This metadata can be automated test specific, such that the metadata is applicable to every screenshot taken while executing the particular automated test, and the metadata may also include information that is only applicable to one or more particular screenshots. For example, the name of the particular flow, the author of the script used to run the test, and the name script are applicable to every screenshot. However, in an automated test that simulates multiple users, each screenshot includes a reference to different user accounts executing the web application for that particular diagram.

Screen Capture Criteria

As previously stated, there is a script that feeds instructions to an automated testing utility 130 and a web application 128 that interacts with the automated testing utility 130. The monitoring agent 132 captures screenshots of the GUI of the web application 128 while the script is being executed by the automated testing utility 130. Screen captures are taken based on a set of criteria that trigger screen captures when certain types of steps are identified in the script, when certain types of actions or events occur in the web application, or a combination thereof. Thus, screen captures may be taken before they are processed by the automated testing utility 130 or after they are displayed in the GUI of the web application 128.

For example, in an embodiment, screen captures occur:

(1) just before a user input action (e.g., click, swipe, keystroke, voice command), (2) just before a web application event (e.g., create element, server request, execute a function), and (3) just before a browser event occurs Because the monitoring agent 132 can track an action just before it occurs by reading the corresponding script, the screen captures occur just before a trigger changes the GUI.

In some embodiments, the screen captures occur just after a computer program responds to actions taken by a simulated user. These screen captures are taken relative to the monitoring agent 132 identifying the trigger action or event occurring in the script and waiting for the action event to actually happen in the computer program or web application. For example, screen captures may occur:

(4) just after a user input action,
(5) just after a web application event, and
(6) just after a browser event A click is an example of a user input action. The screenshots and associated metadata may be captured during any set of criteria that can be received as input by the GUI of the computer program including, but not limited to, selection input, page swipes, shaking an input device with an accelerometer, key strokes, turning a display screen with a gyroscope that detects when the screen is turned, voice activated commands, 2D gestures captured by a mouse or touch screen, 3D gestures captured by one or more cameras (infrared or visible) or one or more motion capturing devices; pressure sensors, thermal sensors, or other forms of sensors known the art.

A validation event is an example of a web application event. Other web application events include, but are not limited to, setting flags, variables, or threshold conditions as met, the creation or deletion of a particular element such as a DOM element, communications between the server side web application and the client side web application in either direction or both directions, internal validation functions such as user input being a certain primitive type or a certain length before forwarding the data to a database, successfully executing a sub-routine or function such as scanning for malware, or any combination thereof.

A page loading is an example of a browser event. Other browser events include loading a previous page in the browser history, loading a next page in the browser history, opening a new page in a new browser, opening a new page in a new tab, saving a page, printing a page, opening a print preview screen, changing the size of text in a web browser, or any combination thereof.

In some embodiments, the monitoring agent 132 may also capture emails or printed documents as they are sent out during an automated test. For example, an email server that is part of web application 118 generates an email that can be processed by the automated testing utility 130. The email may be captured by a dummy email account and a screen may be captured of the email. As another example, a page may be formatted for printing by a printer driver and sent as a PDF to a file folder. The automated testing tool 130 captures the PDF document, and monitoring agent 132 stores a screen of the PDF document.

Additional screenshots may be taken outside the GUI of a particular web application, as part of an automated test. For example, a confirmation message that is sent as an electronic notification to a particular user account may be captured. Electronic notifications can be captured from various application interfaces or proprietary programs, including but not limited to, an SMS message, a Facebook® message, or other messaging services known in the art. Additionally, the web application may include connections to other external web applications. For example, a web application may use Facebook® as an authentication mechanism, or send emails through other third party software as part of the web application.

After the screenshots are captured and stored, the screenshots are uploaded to the annotation engine 134. In addition to uploading the screenshots, the monitoring agent 132 uploads metadata associated with the screenshots captured.

Identifying Relative Location and Size of Elements

Once the monitoring agent 132 identifies a step in a script that includes a trigger action or event, the monitoring agent 132 identifies the object in that step that is associated with the trigger action or event. If the object is visible within the web application 128, then the location of the object within the web application may be captured. Size data for the object may also be captured at this time. If the object is not visible, data regarding the identified object may still be captured for later visualization in a metadata bar.

In some embodiments, location and size data are captured by the automated testing utility 130 because testing utility 130 is already configured to capture location and size data of elements in web application 128. For example, the automated testing utility 130 Selenium can be configured to identify DOM elements based on a name assigned to the web element (e.g., "id=button1"). In this embodiment, the monitoring agent 132 identifies the DOM element that triggers an action or event from a corresponding script, and then requests that the automated testing utility 130 produce a location of the identified DOM element based on the identified element's name or relationship to another DOM element. Typically, the location of an element is the number of pixels (x-value by y-value) from the top left corner of a browser display. The location of an element may then be mapped to a screenshot taken of the GUI. This data may be stored and fed to the annotation engine 134.

In some situations, the monitoring agent 132 checks the parent element of an identified visible object to determine if the visible object is contained within another visible object. For example, the iframe DOM element creates a situation in which the relative location of an object within the iframe is actually relative to the top left corner of the iframe—not the web browser display. To account for the screen within a screen effect, the monitoring agent 132 scans a step containing a visible object that is associated with a trigger action or event for an indication that the visible object is rendered within a parent element. Upon identifying an element to be rendered within another element, the monitoring agent 132 requests, from the automated testing utility 130, the relative location of the parent element in addition to location of the child element.

The relative location of the parent element can be combined with the relative location of the child element to determine the actual location of the child element. For example, the x-value of a parent iframe may be added to the x-value of a button element that is located within that iframe. Similarly, the y-value of the parent iframe may be added to the y-value of the button element. This procedure may be executed recursively for a child element that is multiple parent elements deep (e.g. iframe within an iframe within the browser).

In some embodiments, location and size data for a visible object are captured after performing edge detection. An automated testing utility 130 that tracks web application events and simulates user actions based on pixel coordinates alone may not be pre-configured to identify the size and location of visible objects associated with those pixel coordinates. In these embodiments, the monitoring agent 132 may be configured to perform edge detection based on pixel coordinates within a corresponding script. Edge detection involves identifying a group of pixels of similar color and associating those pixels as a single visible object. The location and size data of the single visible object may then be captured by the monitoring agent 132. This technique may be useful for web applications that are not browser based.

In some embodiments, the monitoring agent 132 may identify the relative location of an element based on source code of a web application 128. For example, if a web application 128 is written in flash or java, the particular visible elements within the web application may be identifiable by scanning the source code for keywords that identify the names and locations of the particular elements that known to be visible to an end user. The relative location of the particular elements are then mapped to any screenshots captured.

De-Duplication

Occasionally, multiple screenshots are taken of the same GUI screen based on different events. For example, if a screenshot is taken of a page upon loading the page, and a second screenshot is taken of the page just before a click action occurs, then there may be two screenshots of the same page. As another example, the automated testing utility 130 may wait on three different validation events to occur before the next step in a script may occur. In such cases the same screenshot may be taken three times.

In an embodiment, the monitoring agent identifies duplicate screenshots using a pixel-by-pixel comparison of each consecutive screenshot in an automated test, and only passes one screenshot on to the annotation engine 134. In alternative embodiments, the monitoring agent may track the GUI for changes caused by the web application and simply not take a second screenshot if no changes have occurred despite an additional trigger event occurring.

Metadata Captured

Metadata may be captured while each screenshot is taken during an automated test. In an embodiment, the metadata captured includes, but is not limited to, the interaction that caused the screenshot to be captured, the location and dimensions of an element that is clicked on a page, the URL of a page that received the click, and the type of user that has accessed the page being clicked.

In some cases, the metadata that is captured may be instrumental for interpreting the screenshots taken during the test. Metadata may be broken into per screenshot metadata and per flow metadata. The per screenshot metadata may include the URL of the webpage that was used to generate the screenshot, the current user who is logged in, the user's email, the user's type (basic, pro, or specific permissions), an account ID, a country associated with the user, whether the user is part of a team, a tally of the number screenshots taken thus far, a step trace of the step within a script corresponding to the screenshot, or any flags applied to the page.

Metadata captured for the entire flow may include the name of the script or automated test, when the script was last updated, the time of the current test (to timestamp the last update of the current flow), the author of the script or automated test, the actual or simulated GPS location of a device accessing the web application being tested, time of day during the access, or any combination thereof.

Annotation Engine

The annotation engine 134 takes the captured screenshots and the metadata captured in association with those screenshots to create an annotation overlay on each screenshot. Annotation engine 134 receives a set of criteria that defines how to annotate the received screenshots. Alternatively, annotation engine 134 may be hardcoded with a set of criteria that defines how to annotate the received screenshots. The set of criteria may include clicking a particular DOM element causes that element to be highlighted yellow; validating the occurrence of a particular DOM element causes that element to be highlighted purple; and loading a particular page does not cause any highlighting annotation.

The highlighted areas may be a specific shape (e.g., rectangle, oval, square, circle, cloud) or color (e.g., red, yellow, blue, green, purple, pink, orange or gray) for each type of annotation and sized at an absolute value larger than the identified element. For example, a DOM element receiving click annotation may be located at pixel 674×282 and have a size 200×50. Thus, the emphasized area is located at pixel 664×272 with a size of 220×70. Alternatively, the emphasized area may be the same shape as the identified element and sized proportionally larger.

In an embodiment, the highlighted color or shape that indicates user input is a different highlighted color or shape than the color or shape indicating the occurrence of a web application event.

Alternative embodiments may include annotations in the same color for user actions and web application events. For example, if the interface of the annotated GUIs is presented in grayscale, the annotations may be all be in the same grayscale color. In order to signify a difference, a shape, texture, icon, or area may be used as an indication that differs depending on whether the annotation was created in response to a user input action or a web application event. Further differentiations can be made through text, symbols, sounds, animations, vibrations, or other forms of output known the art.

A. User Input Annotation Criteria

An area in a screenshot relative to where user input may be received is highlighted in response to detecting a future input of a simulated user. Specifically, a screenshot or web page is captured prior to the simulated user actually providing input to an element on the screen based on a script indicating that the input will happen. Then the area corresponding to the element that will receive the input is highlighted. In an embodiment, the highlighted color is yellow.

A click is an example of user input action criteria. However, annotations may be generated based on any set of criteria that can be received as input by the GUI of the computer program including, but not limited to, selection input page swipes, shaking an input device with an accelerometer, key strokes, turning a display screen with a gyroscope that detects when the screen is turned, voice activated commands, 2D gestures captured by a mouse or touch screen, 3D gestures captured by one or more cameras (infrared or visible) or one or more motion capturing devices, pressure sensors, thermal sensors, or other forms of sensors known the art.

B. Web Application Event Annotation Criteria

An area in a screenshot relative to an event or element occurrence caused by the web application is highlighted or graphically indicated in response to detecting a future or past event of the web application. Specifically, a screenshot is captured prior to the web application actually performing the event. Then the area corresponding to an element that caused the event to be performed is highlighted. In situations where the script is waiting on the creation of a particular element, the screen capture occurs after the element is created. Then the area corresponding to the created element is highlighted. In an embodiment, the highlighted color is purple.

An example of an event occurring in a web application is a script awaiting the creation of "confirm password" text so the user can input the same password into a second text input box after the password is input into a first text input box. The annotated diagram gets a highlight around the "confirm password" text, because that event needs to occur before the script moves to the next step.

A validation event is an example of web application event annotation criteria. Other web application event annotation criteria includes, but is not limited to, verification of setting flags, variables, or threshold conditions; the creation or deletion of a particular element such as a DOM element; communications between the server side web application and the client side web application in either direction or both directions; background functions such as user input being changed to a certain primitive type or hashed before forwarding the data to a database; successfully executing a sub-routine or function such as scanning for malware; or any combination thereof.

In situations where a validation occurs based on background functions, communications between server/client, or variables changing, an indication of a validation may be moved to a status bar overlaid on the screenshot. For example, if a user of the web application is given a user sign-up key (e.g., 12 digit hash token), the user may never actually see the key on their graphic user interface. However, the existence of this sign-up key may be validated in a step of the automated test, and visualized by the annotation engine 134 in the status bar. For example, a 12 digit hash token may be displayed in the metadata bar in a flow diagram of a flow indicating a controller file is accepting the hash token in that flow diagram.

C. Context Annotations

A metadata bar provided at the top of the user interface for displaying the GUI annotations displays context that may affect the specific features that are presented in the GUI. A dynamic web page can change content based on input received before viewing the page. For example, a user's location can change the view of a web page. As another example, a user that has paid for a professional version of the software (e.g., a pro user) may have additional menu items on any given page.

In some cases, multiple automated tests may be executed for performing the same task, but each automated test simulates a user with different authorization permissions. Therefore, the sequence of annotated diagrams may be different for users with different authorizations. In order to properly annotate the flow as belonging to a user with specific permissions, the type of dummy user account that is mimicked by the automated test is visualized in a gray status bar at the top of each annotated diagram.

In addition to describing the authorization of a user, the context annotations may include flags describing the mode in which the web application is executing. For example, current web practices usually provide for a "debug mode" flag and a "pre-deployment" flag. With the debug mode flag activated (e.g. set to true), additional status bars and error messages are presented to the user running the web application. These additional visualizations may help the programmer identify the root of any errors caused in the web application, but such error messages would only serve to confuse an end user. Providing context to the viewer of the flow that the debug mode flag is set to TRUE indicates to the viewer that the flow is primarily for internal use. The "pre-deployment" flag is a way of implementing a feature in a currently deployed web application without actually exposing the feature to the end user. This allows some features to run within the web application without end users seeing the features. For example, setting the "pre-deployment" flag to FALSE causes a function to check a variable without displaying an image in response. Any errors caused by checking the variable may be noticeable, but an end user may not be aware that a new feature was implemented. Setting the "pre-deployment" flag to TRUE, allows the viewer to actually see the graphic image that is created in response to checking the variable. Exposing the pre-deployment flag allows the viewer of a flow to see whether they are viewing a web application in pre-deployment.

Additionally, flags may be set for A-B testing. In A-B testing, a first percentage of users are given a first page with a first set of content, features, and/or controls, and the rest of users are given a second page with a second set of content, features, and/or controls. The first set and the second set contain at least one element that is different. Then user statistics are gathered regarding each page to see which pages' content, features, and controls performed better in terms of a metric (e.g., page views, downloads, time on a page, number of pages completed within the flow). The "better" page is eventually deployed as the primary page that all users see. A-B testing can be performed with three or more different pages that are supposed to perform the same task, but traditionally A-B testing is only performed with two different pages that perform the same task. Thus, metadata (e.g., flags) may be captured defining whether the screenshot is derived from an A-test page or a B-test page.

As a consequence of exposing multiple flags to the viewer, the viewer can also see how a feature looks and/or reacts with different combinations of flags being set to TRUE. For example, if a first flag is set indicating a "pro" user, but a second flag is set to turn off animations, then the PRO user GUI may look worse than the unpaid user interface. This is an indication that PRO users with flash or JavaScript turned off should get a different view of a particular feature.

Additional background data may be presented as well. For example, a mouse over of the metadata bar provides the author of the script used to generate the flow and/or the type of browser and/or operating system that was used to run the automated test.

D. Step Trace Annotations

Each annotated screenshot may contain indications as to the automated test to which it corresponds, and further defines the step within the automated test in which the screenshot was taken. Thus, a user interface that displays the flows of annotated user interfaces may also pull the corresponding script from the script repository 142, so a user can view the script of an automated test alongside the flow for that automated test.

In some embodiments, an annotated diagram includes the screenshot of a webpage in a first panel next to a screenshot of the script of the automated test in a second panel. The line of the script in the automated test that corresponds to the screenshot of the webpage may be highlighted. Alternatively, a user interface for viewing flows may include a toggle control that allows a user to switch between a panel displaying the automated test and a panel displaying the current annotated screenshot of a particular flow. Toggling need not be limited to showing a first panel and then hiding the first panel and showing a second panel. Rather, the toggle control may cause one panel to become bigger than the other panel, cause one panel to overlay on top of another panel, or simply turn on and off one panel, while leaving the other panel on at all times.

Example Creation of a Flow

Generating a sequence of annotated diagrams, referred to herein as a "flow" involves tracking a first set of criteria that triggers capturing a screenshot and annotating based on a second set of criteria that determines where and how the screenshots are annotated.

FIG. 2A is a block diagram illustrating an example script that is used to generate a flow. FIG. 2A includes a script 200 with seven steps that may be referred to as browser steps, user action steps, and web application steps. Loading a page (e.g., step 1) and loading an email (e.g., step 6) are browser steps. Clicking buttons and generating text input are user action steps (e.g., steps 2, 3, and 5). Waiting for DOM elements to appear or waiting for background flags, functions, or variables to meet threshold conditions are web application steps (e.g. steps 4 and 7).

FIG. 2B is a table illustrating example criteria used to generate a flow. The criteria 202 may be broken into a screen capture criteria in the first column and second column, and annotation criteria in the first column and third column. The first column defines actions and events within a script that trigger a screen capture. In this embodiment, the actions and events are defined broadly based on types of functions that may occur within script 200. In other embodiments, the actions and events may be defined more narrowly, such as "clicking buttons with a certain color attribute" or "waiting for the situation where the 'A' key is pressed." The second column defines when the screenshot should be captured relative to the step being executed in the script 200 by the automated testing utility 130. Screen captures are taken before click actions and validation events, and screen captures are taken after page load events and validation of the occurrence of an element.

As depicted in FIG. 2B, the first set of criteria can be combined to generate rules for capturing a screenshot like after a web page loads, before a click input, before validation events, and after validation of elements within the web application. The second set of criteria can be combined to generate rules for highlighting a given screenshot in a specific color based on the location of an associated element that receives a click or validation interaction. In this example, the click input is set to be highlighted yellow and elements associated with the occurrence of an event or element are set to be highlighted purple.

Figure 3:
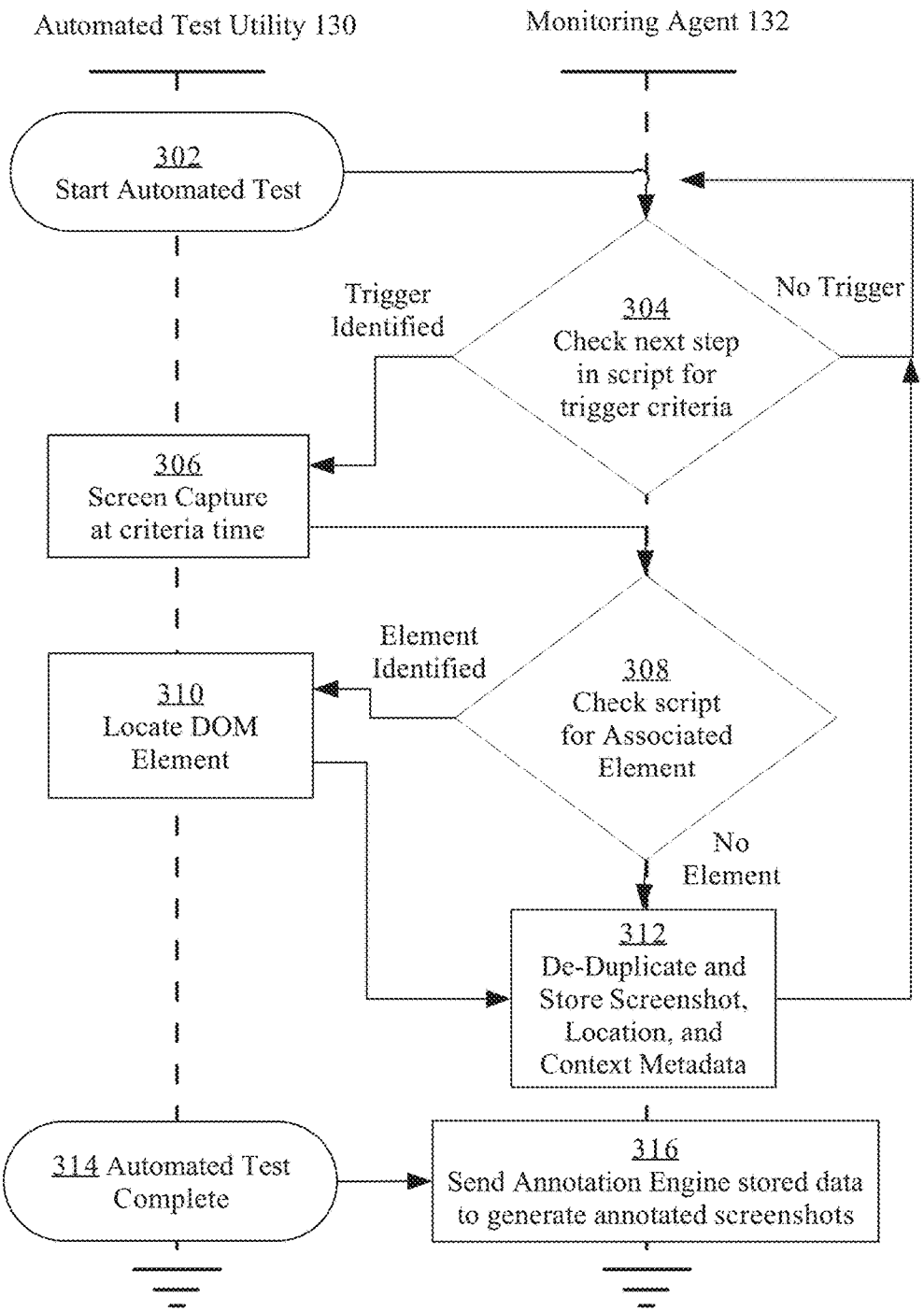
FIG. 3 is a flowchart illustrating an example program flow of a screen capturing and metadata capturing technique.

FIG. 3 is a flow diagram illustrating how an automated testing utility 130 and a monitoring agent 132 communicate to run the automated test and capture screenshots and metadata while the automated test is running. At step 302, automated testing utility 130 starts running a script, and the monitoring agent 132 starts iterating through the program flow described in flowchart 300 to process various actions and events that may occur in a step of an executing script. After the first iteration of the program flow is complete, the program flow loops back to step 304 to process the next step until the automated test is complete at step 314. Then, at step 316, the data stored during the previous iterations is sent to the annotation engine to generate a sequence of annotated screenshots.

A. Screenshot and Metadata Capture of a Load Step

Some iterations of the program flow may result in screenshot and metadata capture associated with a load step. For example, assume at step 304 the monitoring agent 132 scans a step in an executing script and determines the step contains a load action. The monitoring agent 132 compares the load action to screen capture and annotation criteria for that automated test to determine that the automated testing utility 130 should capture a screenshot after the action occurs. At step 308, the monitoring agent 132 identifies, from the executing script, whether a DOM element (e.g., an HTML page) is associated with the trigger action. Continuing step 308, the monitoring agent 132 compares the trigger action against the screen capture and annotation criteria to determine if location data and/or size data of the associated DOM element must also be captured. Assuming no location data is necessary, the monitoring agent 132 stores the new screenshot data and context metadata at step 312, and the process loops back to step 304.

As an example, this program flow may apply to step one and step six of script 200. In step one, the automated testing utility 130 interfaces with a web browser to load a web page that is captured. In step six, the automated testing utility 130 captures an email that was sent by the web application 118. In order to capture the email, an email client on testing computer 122 may be configured to interface with the automated testing utility 130.

B. Screenshot and Metadata Capture of an Input Step

Some iterations of the program flow may result in screenshot and metadata capture associated with an input step. For example, at step 304 the monitoring agent 132 may check a step in an executing script to determine the step contains an input action. The monitoring agent 132 compares the input action to screen capture and annotation criteria for that automated test to determine that the automated testing utility 130 should capture a screenshot before the action occurs. For example, clicking a button may be a trigger action that requires capturing a screenshot before the action occurs. At step 308, the monitoring agent 132 identifies, from the executing script, whether a DOM element (e.g., a button) is associated with the trigger action. Continuing step 308, the monitoring agent 132 compares the trigger action against the screen capture and annotation criteria to determine if location data and/or size data of the DOM element must also be captured. Continuing the example with the DOM element being a visible element such as a button, location and size metadata of the visible element is captured at step 310.

At step 312, the monitoring agent 132 may de-duplicate any redundant screenshots by comparing the new screenshot against one or more screenshots from previous steps. If the screenshots are the same, the monitoring agent 132 may discard the new screenshot, but still store the location, size, and context metadata corresponding to the screenshot in the step that is currently being processed.

As an example, this program flow may apply to step two and step five of script 200. In both steps, the web application is receiving a click of a button, which is a visible element that is tracked in annotation rules 202. In other examples, different input or visible elements may be tracked based on different trigger criteria. For example, the triggering input action could be a swipe, drag and drop, double tap, pinching in, pinching out, or any combination thereof. The visible element could be an image, text box, applet, div panel, a class of objects or elements within the web application, or any combination thereof.

C. Detecting a Step without Trigger Criteria

Other iterations of the program flow may include detecting a step that does not include trigger criteria. For example, after looping back to step 304, the monitoring agent 132 may check a step in an executing script to determine the step does not contain a trigger action or event according to the corresponding capture and annotation criteria. In the case that no trigger action or event is detected, the monitoring agent 132 loops back to step 304 and checks the next step.

As an example, step three of script 200 is not a trigger action according to screen capture and annotation criteria 202. Because text input is not a trigger action or event, the monitoring agent 132 loops back from step 304 to step 304 and processes the next step in the script 202.

D. Screenshot and Metadata Capture of Validation Step

Some iterations of the program flow may result in screenshot and metadata capture associated with a validation step. For example, assume at step 304 the monitoring agent 132 scans a step in an executing script and determines the step contains a validation event. The monitoring agent 132 compares the validation step (e.g., waiting for an event) to screen capture and annotation criteria for that automated test to determine that the automated testing utility 130 should capture a screenshot before the event occurs. At step 308, the monitoring agent 132 identifies, from the executing script, whether a DOM element (e.g., a textbox) is associated with the trigger event. Continuing step 308, the monitoring agent 132 compares the trigger event against the screen capture and annotation criteria to determine if location data and/or size data of the associated DOM element must also be captured. As an example, assume the DOM element is a validation of text in a textbox, so automated testing utility 130 takes location metadata of the textbox at step 310.

At step 312, the monitoring agent 132 may de-duplicate by comparing the new screenshot against one or more previous screenshots for the automated test. Assuming no previous screenshots are the same, the monitoring agent may then store the new screenshot, as well as location, size, and context metadata.

As an example, this program flow may apply to step four and step seven of script 200. In step four, the automated testing utility 130 interfaces with a web browser to identify waiting for text input in a textbox. According to trigger criteria 202, waiting for an event to occur results in capturing a screenshot before the event actually occurs. In step seven of script 200, the automated testing utility 130 interfaces with a web browser to identify the occurrence of an element rather than an event. According to the trigger criteria 202, the screenshot is captured after the web application creates the element.

Annotation Steps

At step 314, the automated testing utility 130 completes the automated test, and at step 316, the monitoring agent 132 sends the data that was stored in each 312 step to the annotation engine 134 to generate a sequence of annotated screenshots. Each screenshot may be processed with its corresponding data to determine if an element needs to be highlighted and what contextual metadata needs to be added. Then an annotation overlay is added to the screenshot. After each screenshot is annotated, a sequence of annotated screenshots are stored as a flow.

FIGS. 4A-4E are example diagrams of a flow illustrating a simulated user adding a member to a limited team based on script 200. Annotation engine 134 collects data stored by monitoring agent 132 and annotates each screenshot accordingly to create a flow. Some screenshots may have multiple element annotations depending on de-duplication step 312 removing a screenshot but keeping location data and context data regarding that screenshot.

A. Example Annotation of a Click Step

Figure 4A:
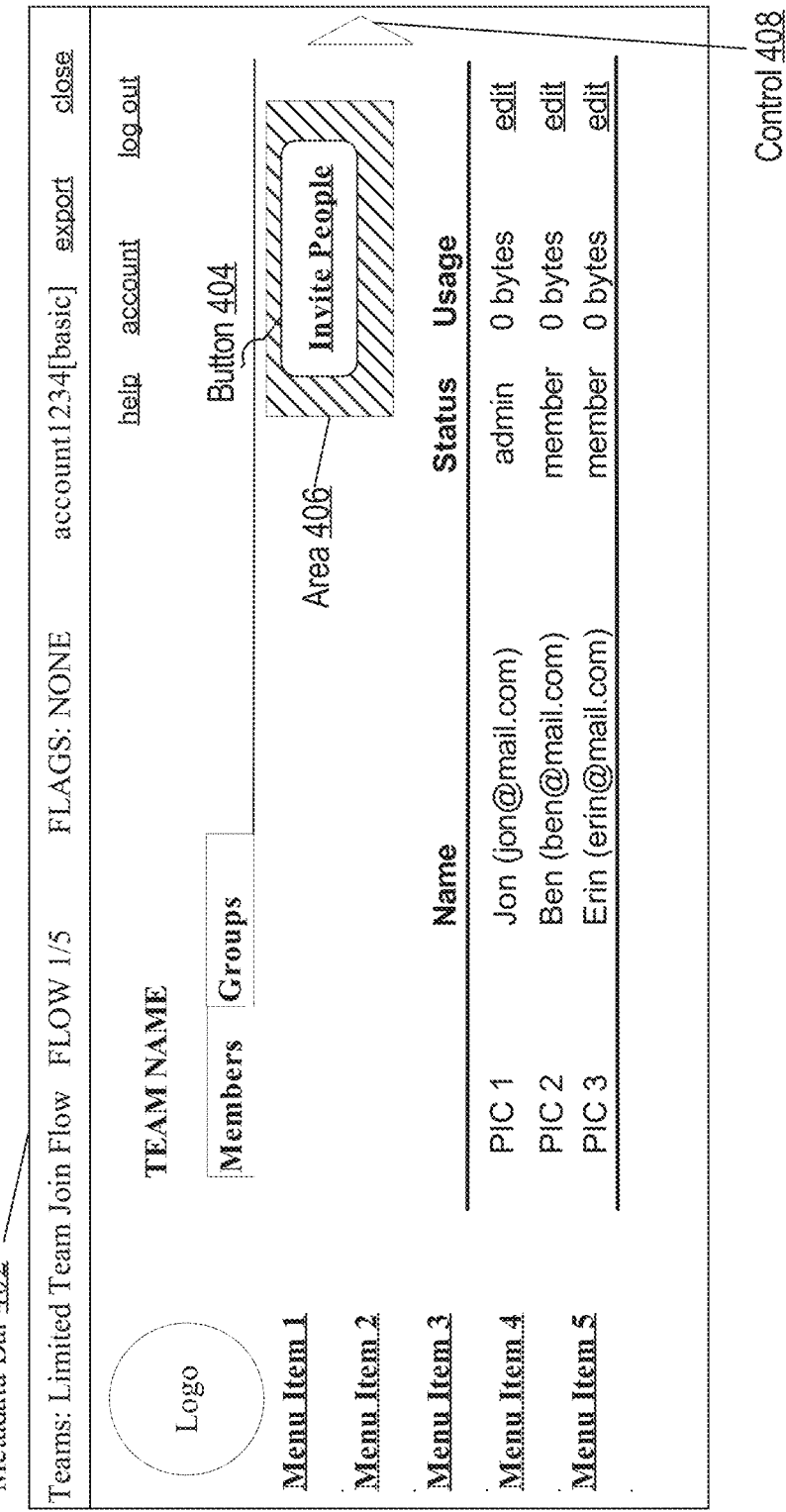
FIG. 4A is a first example diagram of a flow illustrating a simulated user clicking on an invite people button.

FIG. 4A is a first example diagram of a flow illustrating a simulated user clicking on an invite people button. The example diagram includes metadata bar 402, button 404, area 406, and control 408. A screenshot for flow diagram 400 and corresponding metadata was captured by monitoring agent 132 during step one of script 200. The monitoring agent also captured additional metadata and identified and located the "invite people" button 404 in step two of script 200. Using this information, annotation engine 134 overlays highlighted area 406 on flow diagram 400.

A flow diagram may also contain a metadata bar that includes context including the name of the overarching flow, an indication of the particular flow diagram within the flow, the number of flow diagrams within the flow, any flags that correspond to the automated test, and the account and type of account running the test (e.g., whether the user is a "pro" or "basic" user). Additional controls are provided for exporting the flow (e.g., save, share, or print) and closing the flow to return to a home screen (e.g., FIG. 5). In the example flow diagram 400, the metadata bar 402 shows the name of the overarching flow to be "Limited Team Join Flow", the number of the flow diagram to be 1 of 5, and the flags to be "NONE".

Annotation engine makes the metadata bar 402 selectable, to enable the user to toggle to the step of script 200 that the screenshot corresponds to (e.g., step two of seven). Thus, a view of script 200 is provided with a highlight around step two if a user selects address bar 402. Additionally, control 408 may be selected to move to the next screen in the flow.

B. Example Annotation of a Validation Step

Figure 4B:
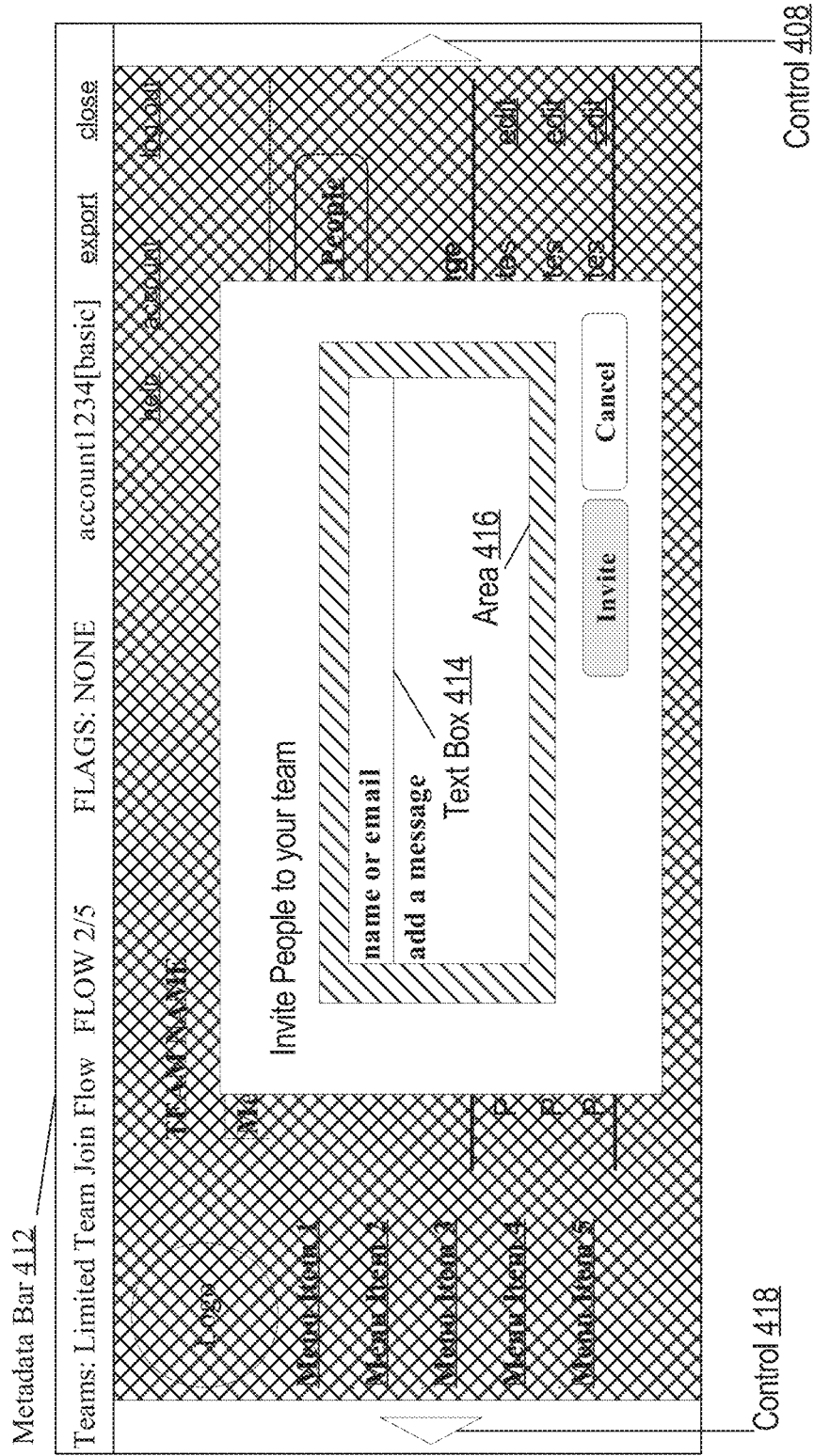
FIG. 4B is a second example diagram of a flow illustrating a web application validating that a particular textbox has been given an email address as text user input.

FIG. 4B is a second example diagram of a flow illustrating a web application validating that a particular textbox 414 has been given an email address as text user input. The example diagram includes metadata bar 412, text box 414, area 416, and controls 408, 418. A screenshot for flow diagram 410 and corresponding metadata was captured by monitoring agent 132 during step three of script 200. The monitoring agent also captured additional metadata and identified and located the "email address" text box 414 just before step four of script 200. Using this information, annotation engine 134 overlays highlighted area 416 on flow diagram 410.

Flow diagram 410 also contains metadata bar 412 that includes context on whether the user is a "pro" or "basic" user, any flags, and what flow diagram of the sequence diagrams that the screenshot corresponds to (i.e. FLOW 2/5). Additionally, metadata bar 412 may be selected to enable the user to toggle to the step of script 200 that the screenshot corresponds to (e.g., step three of seven). Thus, a view of script 200 is provided with a highlight around step three if a user selects address bar 412. Controls 418 and 408 may be selected to move to the previous screen or next screen in the flow, respectively.

C. Example Annotation of Another Click Step

Figure 4C:
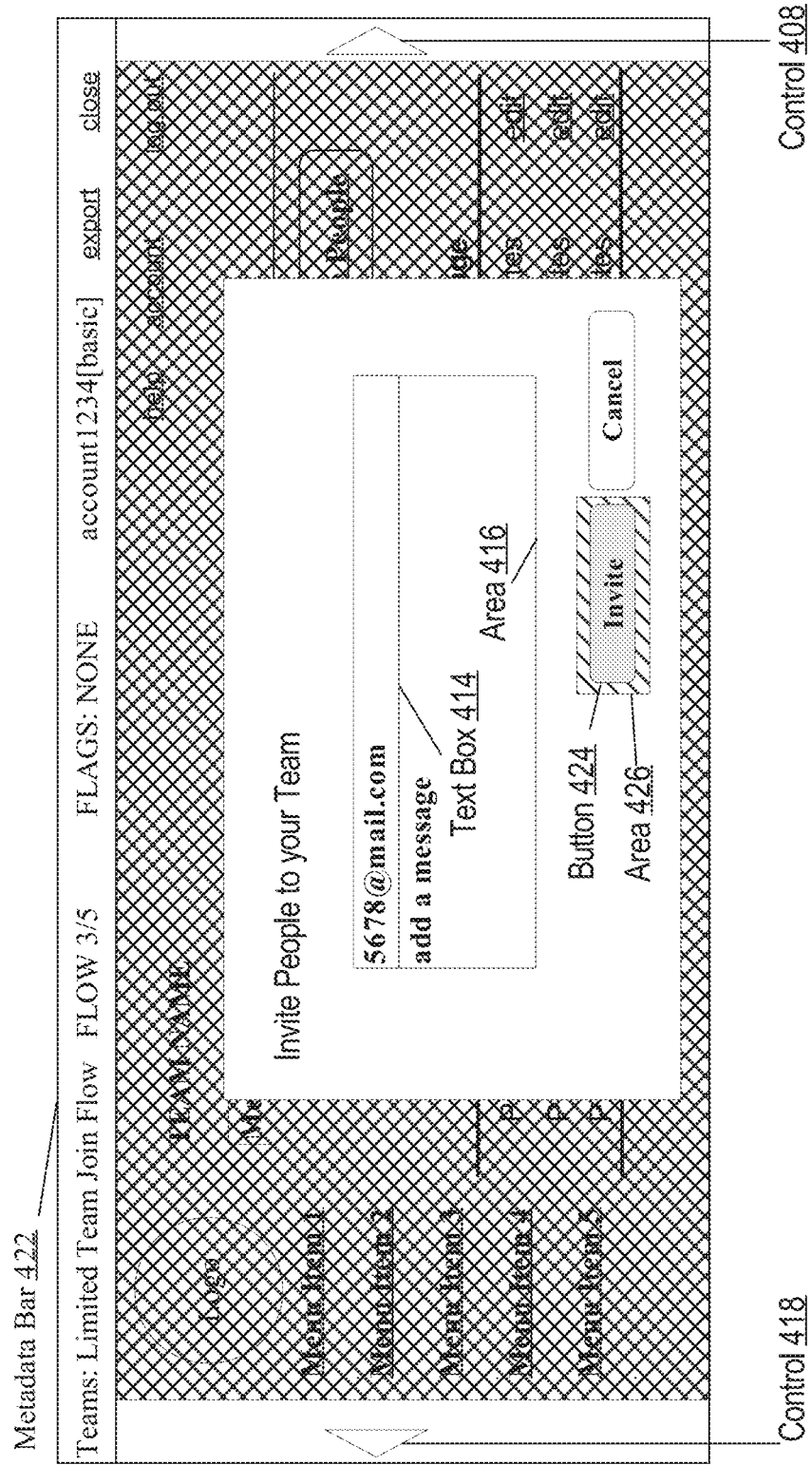
FIG. 4C is a third example diagram of a flow illustrating a simulated user clicking on an invite button.

FIG. 4C is a third example diagram of a flow illustrating a simulated user clicking on an invite button. The example diagram includes metadata bar 422, button 424, area 426, and controls 408, 418. A screenshot for flow diagram 420 and corresponding metadata was captured by monitoring agent 132 just before step five of script 200. The monitoring agent also captured additional metadata and identified and located the "invite" button 424 just before step five of script 200. Using this information, annotation engine 134 adds highlighted area 426 to flow diagram 420.

Note that the screenshot of FIG. 4C is different than the screenshot of FIG. 4B because FIG. 4C contains data in text box 414. If step four of script 200 were to have come after step five of script 200, then there would only be one screenshot and areas 416, 426 would both be on the same flow diagram. The viewer would be able to tell the difference by color or shape. For example, area 416 may be a shade of purple while area 426 may be a shade of yellow.

Flow diagram 420 also contains metadata bar 422 that includes context on whether the user is a "pro" or "basic" user, any flags, and may be selected to determine what step of script 200 that the screenshot corresponds to (e.g., step five of seven).

D. Example Annotation of an Email Step

Figure 4D:
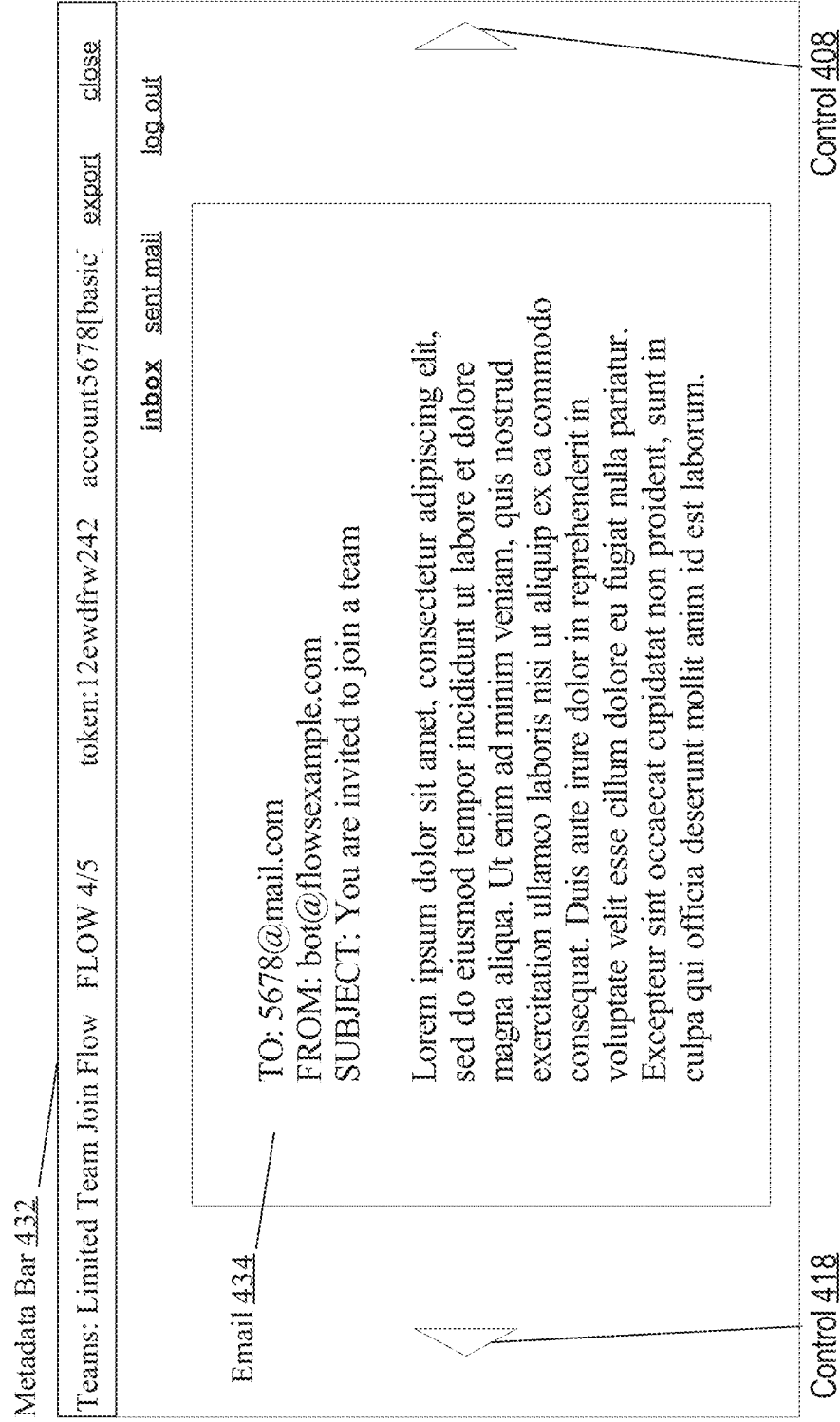
FIG. 4D is a fourth example diagram of a flow illustrating a different simulated user receiving an email.

FIG. 4D is a fourth example diagram of a flow illustrating a different simulated user receiving an email. The example diagram includes metadata bar 432, email 434, and controls 408, 418. A screenshot for flow diagram 430 and corresponding metadata was captured by monitoring agent 132 during step six of script 200. Using this information, annotation engine 134 adds metadata bar 432 to flow diagram 420.

Flow diagrams that are captured from the simulated user's perspective (e.g., account 5678) with the email address 5678@mail.com contain a metadata bar that includes a context about the sent email. The email may be captured and stored with reference to a primary key or address in an email repository or cache. This key or address of the stored email is visualized by the annotation engine in the metadata bar 432 in addition to any flags that are included in that test.

E. Another Example Annotation of a Validation Step

Figure 4E:
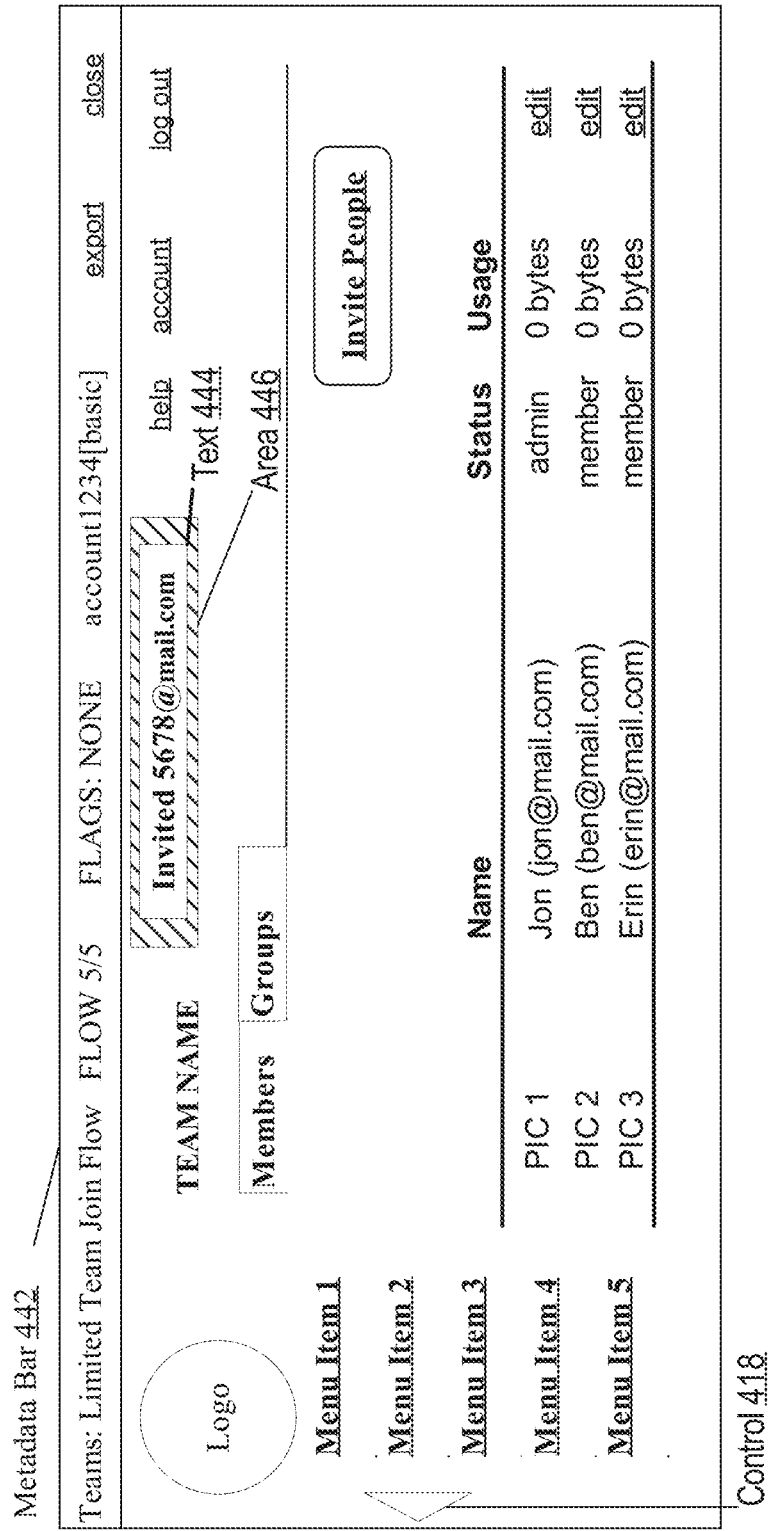
FIG. 4E is a fifth example diagram of a flow illustrating a web application validating that a particular email was sent.

FIG. 4E is a fifth example diagram of a flow illustrating a web application validating that a particular email 434 was sent. The example diagram includes metadata bar 442, text 444, area 446, and control 418. The web application has a background controller file that tells an email server to send a verification email to the email address given in step three of script 200. Once the controller file completely executes, a status bar update may be added to a home page of the web application. A screenshot for flow diagram 440 and corresponding metadata was captured by monitoring agent 132 during step seven of script 200. The monitoring agent also captured additional metadata and identified and located the "status update" text box 444 during step seven of script 200. Using this information, annotation engine 134 adds highlighted area 446 on flow diagram 440. Because this is a validation step similar to step four of script 200, the highlighted area is the same color and/or shape as the highlighted area created based on step four.

Flow diagrams that are captured from the simulated user's perspective with the email address 5678@mail.com may contain a metadata bar that includes additional context that the member is a user type: "limited team member" after the user confirms membership. Depending on the application used to create the flow, a user type indicates permissions of the user including, but not limited to, admin, root user, member, read access member, write access member, sharing member, file creation member, limited time member, or any combination thereof. The permissions may allow a user to create, read, update, or delete content items, team members, team member permissions, or any combination thereof.

Search Feature

Metadata that is associated with each particular diagram within a flow may be indexed. Additionally, metadata that is associated with an entire flow may be indexed. In an embodiment, each flow for a web application is indexed based on the name of the script used to create the flow, and individual URLs associated with the different flow diagrams within each flow are also indexed. Flows interface 136 may then receive search terms for all of the flows that reference a particular URL or by name of the associated script.

Figure 5:
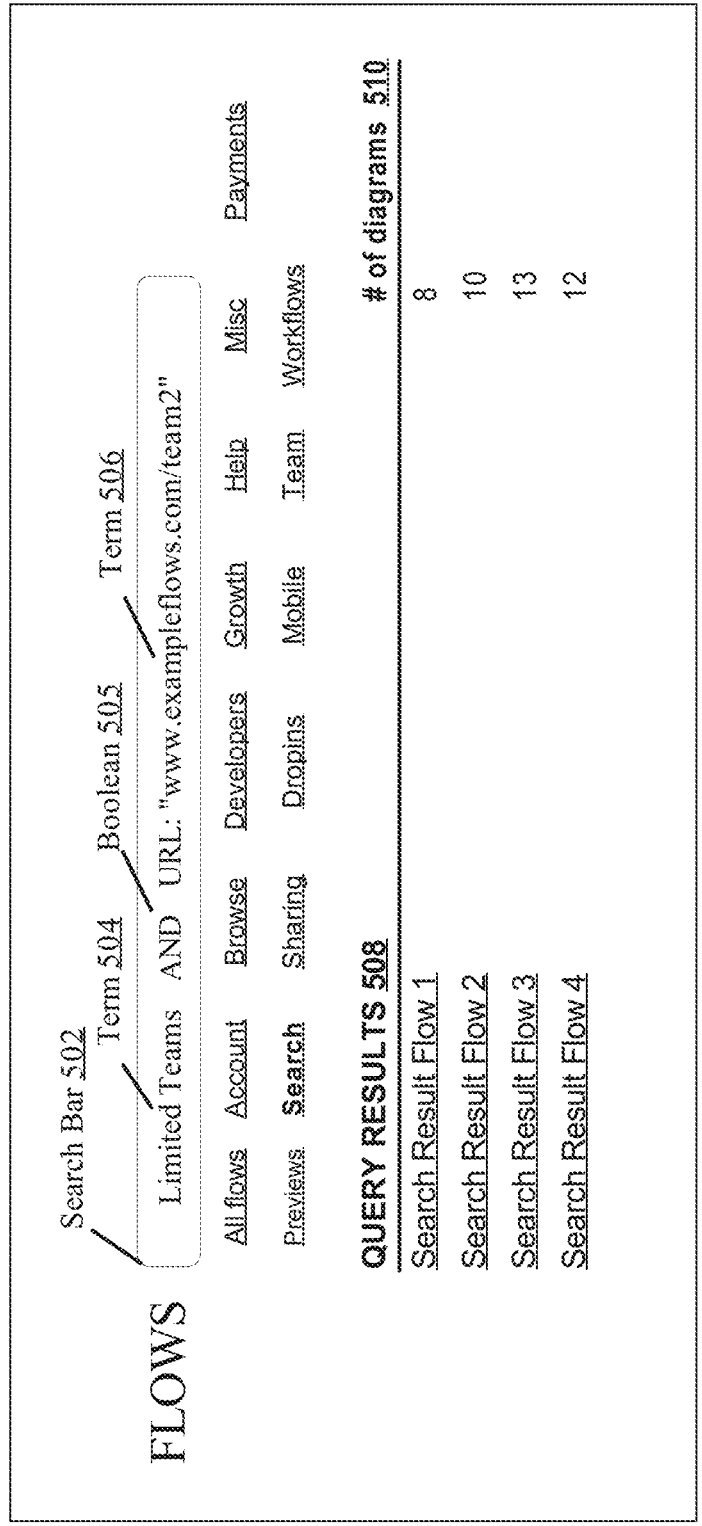
FIG. 5 is an example diagram illustrating a user interface receiving search terms to identify a particular flow.

FIG. 5 is an example diagram illustrating a user interface receiving search terms to identify a particular flow. Search terms 504 and 506 are entered in search bar 502 along with Boolean connector 505. Boolean connectors, include, but are not limited to, AND, NOT, OR, NOR, XOR, within (n) words, within (p) paragraphs, BEFORE, and AFTER. Search term 504 may be a string that is compared against the names of the flows in flows repository 144. Search term 506 is a key-value pair that is compared against the indexed URLs of each flow diagram in flow repository 144. The search results 508 that meet the conditions of the search terms are displayed along with the number of steps or flow diagrams 510 in each flow. In an embodiment, clicking on a particular search result of the search results 508 causes flow interface 136 to jump to the first flow diagram of that flow (e.g., FIG. 4A). In some embodiments, clicking on the # of diagrams 510 of a particular search result causes flow interface 136 to jump to an overview of the flow diagrams in the flow (e.g., FIG. 6A).

Flows repository 144 as depicted in FIG. 1 is a separate repository, but all or portions of flows repository may be cached (or stored entirely locally) as part of flows interface 136 to enhance the performance of user interface 500. Search bar 502 may include a type ahead feature or suggestion features for adding particular terms and connectors to the search query (e.g., collectively 504, 505, and 506).

In some embodiments, all displayed data associated with each flow is indexed (e.g., data including digital data, photos, text, audio, video, streaming content, etc.) During flow creation, monitoring agent 132 captures all visible text and images on each screen of web application 128 while an automated test is being executed, and all the text and images are indexed in a full-text search index using an engine such as Lucene. Thus, any word that occurs within the web application can be searched and the flows referencing that word or combination of words are returned as results in flow interface 136. The one or more images of a particular flow may be made into thumbnails and used in displaying search results.

In still other embodiments, all metadata associated with each flow is indexed. This includes not only the metadata previously discussed such as flags, user types, and the number of steps in the flow, but also web page metadata such as indexing flows by stylesheets, function calls, flow creation data and time, teams or employees in charge of the flow.

Interface for Presenting Selected Flows

Once a particular flow is selected, the program presents a user interface for presenting the annotated GUIs. The presentation user interface includes controls for selecting the next and previous annotated screenshots in the flow. These controls may be provided to the user as buttons displayed on the screen such as with buttons 408 and 418 in FIGS. 4A-4E. Additionally, the controls may be tied to specific hardware buttons on a user device, such as arrows keys on a keyboard. As another example, a touch screen device may be configured with instructions, when executed by a processor, that cause the user interface to present the next annotated screenshot in a flow when the user swipes left, and causes the user interface to present the previous annotated screenshot in the flow when the user swipes right on the touch screen display.

Comparing Flows

In some embodiments, two or more flows may be selected for comparison purposes. In one embodiment, when a single flow from results 508 is selected, one or more past versions of the flow are displayable with a current version of the flow. Alternatively, a user may select two or more flows from results 508 before selecting a control to view the flows together. Viewing multiple flows together may be useful when reviewing the evolution of a web application by comparing one or more past flows and a current version of the flow, comparing the implementation of a new feature between a past flow and a current flow, comparing multiple implementations of the same feature in an A-B test, comparing multiple translations of a single flow, or any combination thereof.

FIG. 6A is an example diagram illustrating a user interface that compares two flows. User interface 600 includes two flows 610, 620. Flow 610 further includes selectable flow diagrams 612, 614, 616, and 618. Flow 620 further includes selectable flow diagrams 622, 624, 626, and 628. After a particular flow diagram is selected, the flow may be presented to the user as in FIG. 4A-4E. However, in this embodiment, an additional control is provided with each screen allowing the user to quickly switch between corresponding flow diagrams from different flows. For example, any given flow diagram in flow 610 has an additional down arrow button that allows the user to view a corresponding flow diagram in flow 620. Similarly, any given flow diagram in flow 620 has an additional up arrow button that allows the user to view a corresponding flow diagram in flow 610. In alternative embodiments, two or more corresponding flow diagrams may be presented in a single view using split screens.

User experience (UX) may also be maximized by comparing two flows that use the same URL for at least one flow diagram, so the interactive elements of each flow can be tailored to inducing a real user to complete that flow without interfering with the interactive elements of another flow. The corresponding flow diagrams from each flow are presented as the result of a search of a URL. The flows may be aligned based on the corresponding URL. Thus, a user can easily switch between all of the different flow diagrams created based on that particular URL.

FIG. 6B is an example diagram illustrating a user interface that compares two flows that each include a flow diagram generated from a common URL. User interface 630 includes two flows 640 and 650. Flow diagram 642 and flow diagram 654 are generated from a page with the same URL 632 although the pages may include different annotations. Thus, the flow interface 136 aligns the flow diagrams 642, 654 that correspond to each other based on the same URL 632. Flow diagrams 644 and 656 may correspond to one another or may not. However, the user may be given the option to toggle between these flow diagrams so the user can see whether the flows continue to be similar or whether they diverge. In alternative embodiments, two or more corresponding flow diagrams may be presented in a single view using split screens.

Updating Flows and Flow Diagrams

A flow may be updated whenever a script is executed at computer 122. Alternatively, flows may only be updated automatically every time a developer commits new code to the master branch of a code repository. Alternatively, or additionally, flows may be updated periodically, such as daily, weekly, monthly, or yearly. Through any one or combination of these methods, each flow includes a timestamp as metadata that can be searched using the search feature of flow interface 136.

Using one of these methods, specifically updating flows periodically, the flow repository 144 may become quite large. In order to keep duplicate flow diagrams from filling up repository 144, each flow diagram may be compared with the previous version of its corresponding flow diagram on a pixel-by-pixel basis. If a flow diagram includes any different pixels, then a new flow diagram is saved with a new timestamp. This does not mean that every flow diagram in the flow requires a new timestamp. Instead, a user is able to toggle between the new flow diagram and the old flow diagram while reviewing the flow.

FIG. 6C is an example diagram illustrating a user interface that compares two versions of a single flow. User interface 660 has two versions of flow 670. The current version taken at timestamp 664 includes flow diagrams 672, 674, 686, and 678. The previous version taken at timestamp 662 includes flow diagrams 672, 674, 676, and 678. Only one flow diagram 686 needs to be stored after the up-to-date flow is generated because a pixel-by-pixel comparison of the flows shows that flow diagrams 672, 674, and 678 are the same.

Alternatively embodiments may include additional or alternative comparisons, such as a comparison of all data and/or metadata within each page that corresponds to a particular flow diagram.

Alerts and Emails

In some embodiments, it is useful for users to be made aware when a flow has been added or updated to repository 144. In such embodiments, a user may receive an indication when a flow has been updated or a new flow has been added to repository 144. This may be a "new" or "updated" icon presented next to the flow in interface 136. A user may sign up for alerts for a set of one or more flows. Whenever a particular flow in the set of one or more flows is updated, the user is sent an electronic notification of the update. In some embodiments, the electronic notification is an email sent to an email address associated with the user account. This embodiment includes an email server (not shown) added FIG. 1. In some embodiments, the electronic notification may be an indication of the update within the flow interface 136. Users may also sign up for an electronic notification of existing flows and/or new flows on a daily basis.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
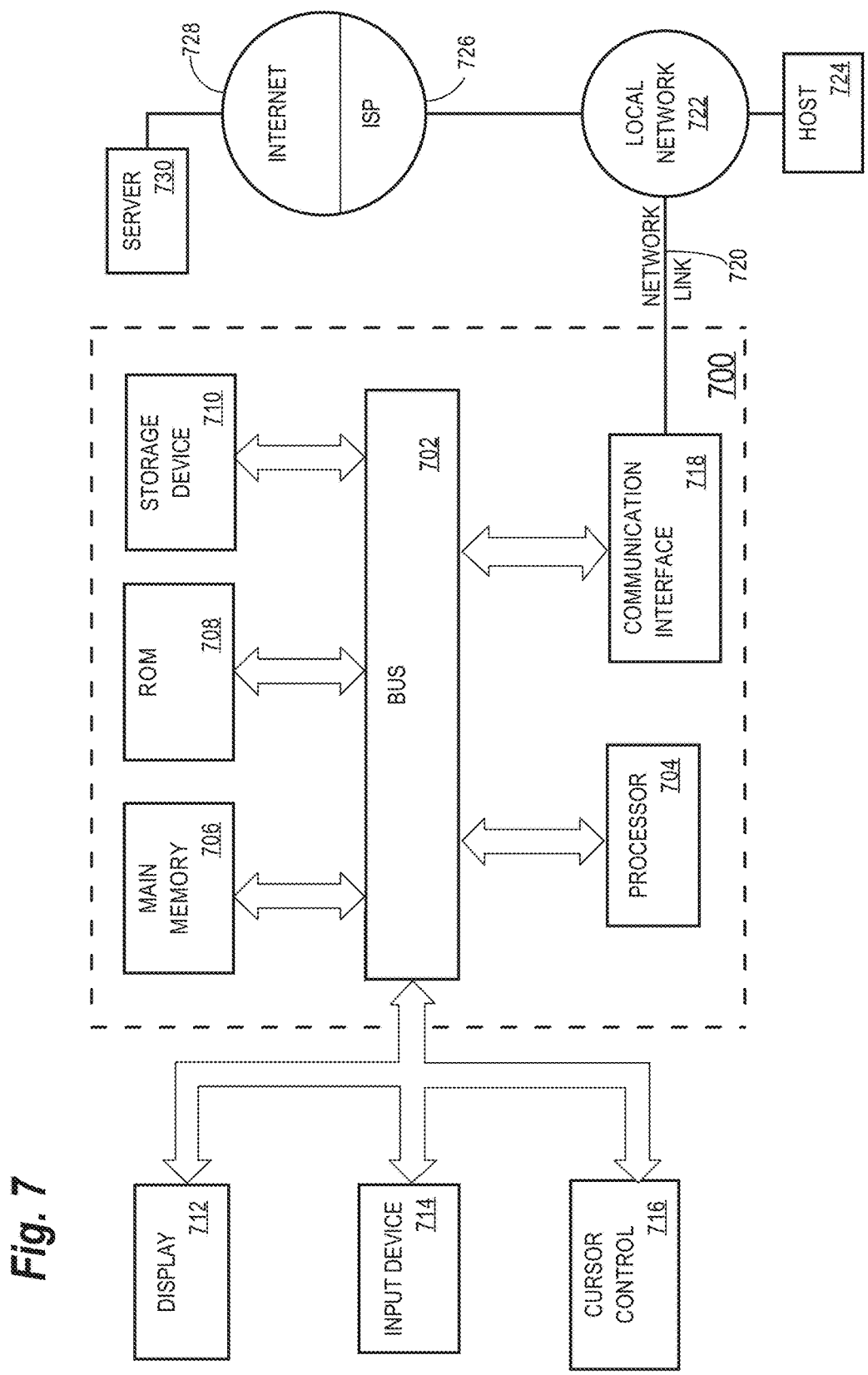
FIG. 7 is a block diagram illustrating a computer system that may be used to implement the techniques described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that include bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   detecting that an automated test script includes at least a user action step and a web application step, the automated test script defining an automated test as a sequence of interactions with elements of a web application;
   wherein the user action step, when executed during an execution of the automated test script, simulates a user input to the web application;
   wherein the web application step, when executed during the execution of the automated test, waits for an occurrence of a particular event in the web application;
   wherein the web application step, when executed during the execution of the automated test, does not simulate any user input to the web application;
   based on the detecting that the automated test script includes the web application step, determining when, during the execution of the automated test script, the web application step is executed, and capturing a particular screenshot, of a graphical user interface of the web application, based on the determining when, during the execution of the automated test script, the web application step is executed;

based on the capturing the particular screenshot, annotating the particular screenshot to indicate a particular element of the web application with which the occurrence of the particular event is associated, thereby producing an annotated screenshot;

including the annotated screenshot in a flow, the flow comprising a sequence of a plurality of annotated screenshots; and wherein the method is performed by one or more computing devices.

2. The method of claim 1, further comprising capturing one or more screenshots includes capturing a plurality of screenshots based on a first set of criteria.

3. The method of claim 1, further comprising capturing one or more screenshots includes capturing source code of each screen loaded in the automated test based on a first set of criteria.

4. The method of claim 1, further comprising capturing one or more screenshots includes de-duplicating any screenshots that are captured that comprise a same pixel data.

5. The method of claim 1, wherein capturing the particular screenshot occurs before the web application step is executed during the execution of automated test script.

6. The method of claim 1, wherein annotating the particular screenshot to indicate the particular element includes highlighting an area associated with the particular element.

7. The method of claim 6, wherein annotating the particular screenshot to indicate the particular element includes:
determining a first location of the particular element;
determining a second location of a parent element of the particular element; and
combining relative x and y values of the first location and the second location to highlight the area associated with the particular element.

8. The method of claim 1, further comprising displaying an indication of the particular event in a status bar.

9. The method claim 1, wherein capturing the particular screenshot occurs after the occurrence of the particular event.

10. The method of claim 1, further comprising capturing an additional screenshot if a second element receives a click.

11. The method of claim 1, further comprising:
responsive to detecting that the automated test script includes a second step that clicks a second element, capturing a second screenshot based on when the second step is executed.

12. The method of claim 11, further comprising annotating the second screenshot based on the second element receiving a click.

13. The method of claim 12, further comprising:
highlighting a first area associated with the particular element; and
highlighting a second area associated with the second element in a different color or shape than the first area.

14. The method of claim 1, further comprising:
storing, in a repository, a sequence of annotated diagrams;
receiving, from a client device, a search query that references data from the sequence of annotated diagrams; and
causing to be displayed, on the client device, the sequence of annotated diagrams.

15. The method of claim 1, further comprising:
storing, in a repository, a sequence of annotated diagrams;
wherein the sequence of annotated diagrams is a first version of the sequence of annotated diagrams;
generating a second version of the sequence of annotated diagrams based on a second automated test that uses a same script; and
updating the repository based on a set of differences between a subset of diagrams in the first version and the second version.

16. The method of claim 15, wherein the set of differences between the first version and the second version are detected using a pixel-by-pixel comparison.

17. The method of claim 15, further comprising:
wherein the first version includes a first timestamp;
wherein updating the repository includes storing a second timestamp for the second version; and
providing an option of viewing the sequence of annotated diagrams as of the first timestamp or the second timestamp.

18. The method of claim 1, further comprising capturing a third screenshot if the automated test loads an email.

19. One or more non-transitory computer-readable media comprising:
instructions which, when executed by one or more hardware processors, cause:
detecting that an automated test script includes at least a user action step and a web application step, the automated test script defining an automated test as a sequence of interactions with elements of a web application;
wherein the user action step, when executed during an execution of the automated test script, simulates a user input to the web application;
wherein the web application step, when executed during the execution of the automated test, waits for an occurrence of a particular event in the web application;
wherein the web application step, when executed during the execution of the automated test, does not simulate any user input to the web application;
based on the detecting that the automated test script includes the web application step, determining when, during the execution of the automated test script, the web application step is executed, and capturing a particular screenshot, of a graphical user interface of the web application, based on the determining when, during the execution of the automated test script, the web application step is executed;
based on the capturing the particular screenshot, annotating the particular screenshot to indicate a particular element of the web application with which the occurrence of the particular event is associated, thereby producing an annotated screenshot;
including the annotated screenshot in a flow, the flow comprising a sequence of a plurality of annotated screenshots.

20. The one or more non-transitory computer-readable media of claim 19, wherein annotating the particular screenshot to indicate the particular element includes highlighting an area associated with the particular element.

21. The one or more non-transitory computer-readable media of claim 20, wherein annotating the particular screenshot to indicate the particular element includes:
determining a first location of the particular element;
determining a second location of a parent element of the particular element; and
combining relative x and y values of the first location and the second location to highlight the area associated with the particular element.

22. The one or more non-transitory computer-readable media of claim 19, further comprising:
instructions which, when executed by one or more hardware processors, cause:
capturing a second screenshot if a second element receives a click; and
annotating the second screenshot based on the second element receiving the click.

23. The one or more non-transitory computer-readable media of claim 22, further comprising:
instructions which, when executed by one or more hardware processors, cause:
highlighting a first area associated with the particular element; and
highlighting a second area associated with the second element in a different color or shape than the first area.

24. A system comprising:
a computer with one or more processors and storage media; and
instructions which, when executed by the one or more processors, cause:
detecting that an automated test script includes at least a user action step and a web application step, the automated test script defining an automated test as a sequence of interactions with elements of a web application;
wherein the user action step, when executed during an execution of the automated test script, simulates a user input to the web application;
wherein the web application step, when executed during the execution of the automated test, waits for an occurrence of a particular event in the web application;
wherein the web application step, when executed during the execution of the automated test, does not simulate any user input to the web application;
based on the detecting that the automated test script includes the web application step, determining when, during the execution of the automated test script, the web application step is executed, and capturing a particular screenshot, of a graphical user interface of the web application, based on the determining when, during the execution of the automated test script, the web application step is executed;
based on the capturing the particular screenshot, annotating the particular screenshot to indicate a particular element of the web application with which the occurrence of the particular event is associated, thereby producing an annotated screenshot;
including the annotated screenshot in a flow, the flow comprising a sequence of a plurality of annotated screenshots.

25. The system of claim 24, wherein annotating the particular screenshot to indicate the particular element includes highlighting an area associated with the particular element.

26. The system of claim 25, wherein annotating the particular screenshot to indicate the particular element includes:
determining a first location of the particular element;
determining a second location of a parent element of the particular element; and
combining relative x and y values of the first location and the second location to highlight the area associated with the particular element.

27. The system of claim 24, further comprising:
instructions which, when executed by the one or more processors, cause:
capturing a second screenshot if a second element receives a click; and
annotating the second screenshot based on the second element receiving the click.

28. The system of claim 27, further comprising:
instructions which, when executed by the one or more processors, cause:
highlighting a first area associated with the particular element; and
highlighting a second area associated with the second element in a different color or shape than the first area.

* * * * *